United States Patent
Bishop

[11] Patent Number: 6,120,218
[45] Date of Patent: *Sep. 19, 2000

[54] PLANING TOOL

[76] Inventor: Todd Bishop, 2235 Lake Whatcom Blvd., Bellingham, Wash. 98227

[*] Notice: This patent is subject to a terminal disclaimer.

[21] Appl. No.: 09/141,464

[22] Filed: Aug. 27, 1998

Related U.S. Application Data

[60] Provisional application No. 60/082,154, Apr. 17, 1998, and provisional application No. 60/058,027, Aug. 29, 1997.

[51] Int. Cl.$^7$ ....................................................... B23C 5/20
[52] U.S. Cl. ................................ 407/34; 407/41; 407/43; 407/49; 407/53
[58] Field of Search ................................ 407/34, 35, 41, 407/43, 49, 53, 113, 116; 409/232, 234, 345; 408/231, 232, 233

[56] References Cited

U.S. PATENT DOCUMENTS

| | | | |
|---|---|---|---|
| 3,091,138 | 5/1963 | Berry, Jr. | 408/232 |
| 3,323,192 | 6/1967 | Gustafson | 407/43 X |
| 3,434,190 | 3/1969 | Kaiser | 407/113 |
| 4,594,928 | 6/1986 | Thomas et al. | 407/43 X |
| 4,922,977 | 5/1990 | Colton et al. | 407/49 X |
| 5,558,142 | 9/1996 | Ehrle et al. | 407/46 X |
| 5,662,436 | 9/1997 | Bishop | 407/35 |
| 5,827,016 | 10/1998 | Strand | 407/116 X |
| 5,857,506 | 1/1999 | Paolone | 407/49 X |

*Primary Examiner*—Henry W. H. Tsai
*Attorney, Agent, or Firm*—Robert B. Hughes; Hughes & Schacht, P.S.

[57] ABSTRACT

A rotary cutting tool having a mounting portion with a plurality of mounting sections, each having a radially aligned pocket to receive a cutting insert. There is a positioning and actuating assembly by which a related wedge block can be positioned in its related pocket in wedging engagement with its cutter insert. The side walls of each pocket converge in a radially outward direction so that centrifugal force of the rotating causes the wedge blocks and the cutters to come into a firmer wedging engagement. The positioning and holding assembly can be moved from its retaining position to permit individual cutting inserts to be moved or replaced. A center bolt assembly moves a central portion of the positioning and holding assembly vertically so as to cause retaining arms to move into and out of retaining engagement with related wedge blocks.

41 Claims, 17 Drawing Sheets

END VIEW

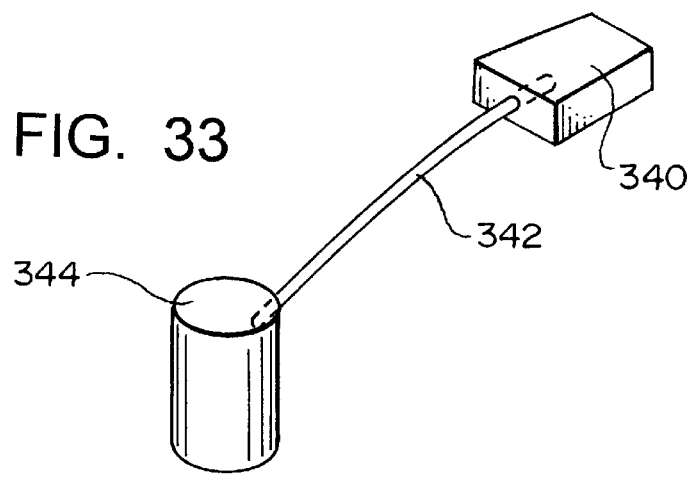
FIG. 33
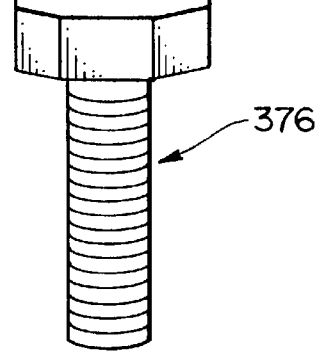
FIG. 34
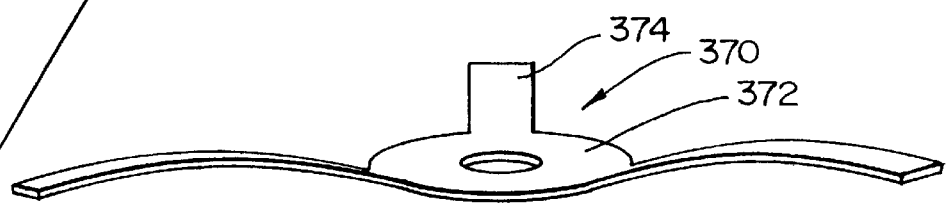
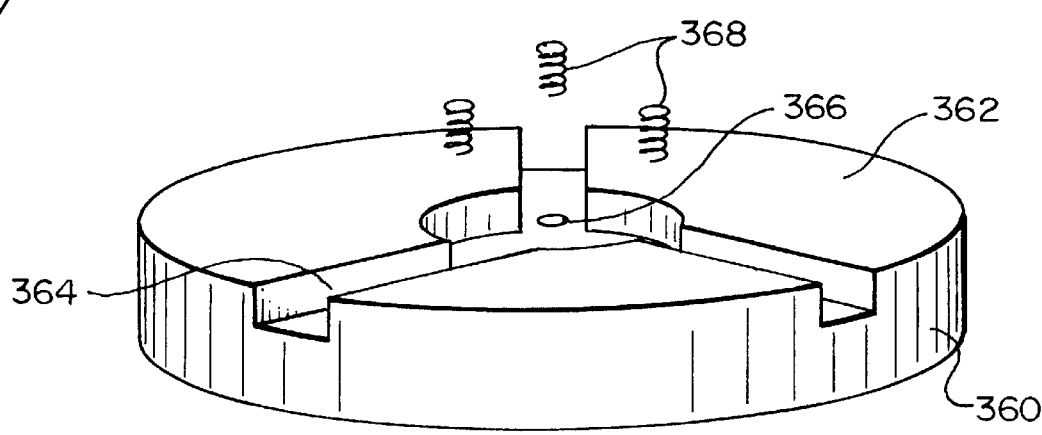

PLANING TOOL

This application claims the benefit of U.S. Provisional Ser. No. 60/082,154 filed Apr. 17, 1998, and also Provisional Ser. No. 60/058,027 filed Aug. 29, 1997.

This invention relates to improvements to a rotating cutting head with general utility, but more particularly to an improved tool for use in hand-held applications for surface stripping or shaping. A novel cutting insert clamping method particularly suited to high rotational speeds is described.

BACKGROUND OF THE INVENTION

Rotary cutters are currently used by the public for both stationary and hand portable applications such as wood planing, paint removal, animal hoof trimming and metal machining. They often utilize replaceable and indexable carbide inserts for cutting. Normal methods for securing cutting inserts to the rotating head include the use of center screws or other small mechanical parts. These are slow to use, subject to damage or loss of small parts, and may come loose during operation endangering the operator. They are also more detailed and expensive to manufacture. For optimum efficiency many materials must be machined at extremely high rotational speeds. A method for holding said inserts is needed that is secure, with minimum potential for disintegration under extreme radial loads.

When mounting a solid cutting tool to a portable power unit such as an electric grinder, lateral oscillations in the rotating shaft result in an up and down motion normal to the plane of the cutting head, resulting in rough cutting action unless an isolation member is inserted between the shaft and the body of the tool.

The present invention produces high clamping pressures on the installed inserts under static conditions and has mechanisms that increase the pressure under radial load. The invention requires no small parts at the periphery of the tool, is easier and simpler for the operator to handle, and can be produced less expensively because fewer parts are required.

SUMMARY OF THE INVENTION

The present invention relates in general to rotary cutting tools, and more particularly to such tools which have removable/replaceable cutting inserts.

The rotary tool of the present invention comprises a mounting structure which rotates about a center axis of rotation. This mounting structure has a plurality of radially outwardly positioned mounting sections. Each mounting section has a pair of side walls which define a related pocket which is aligned to have a substantial radial alignment component. Each pair of side walls converges toward one another in a converging direction which has a radially outward directional component. Each pocket is arranged to have a related cutting insert positioned therein in its cutting position.

The tool comprises a holding assembly which comprises a plurality of positioning and wedging portions for related mounting sections. Each of said positioning and wedging portions comprises a wedging block portion, and has a cutting insert retaining position where the insert and the wedging block portion are positioned in the related pocket. The side bearing surfaces of the wedging block portion and side bearing surfaces of the cutting insert are on load bearing relationship between the related side walls of the pocket in a wedging relationship therewith.

The holding assembly further comprises an actuating portion which is operative engagement with the positioning and wedging portions. The actuating portion is movable to a retaining position to apply force to cause the wedging block portions and the inserts to be urged into wedging relationship with the related two converging side walls. Thus, the actuating portion can be moved to its retaining position to hold the cutting inserts in proper location, and then be moved from the retaining position to reduce the force and thus reduce the force of the wedging engagement. This permits the insert to be adjusted and/or removed and/or replaced.

Also the present invention comprises the components recited above in combination with the cutting inserts each positioned in its cutting position in its related pocket.

Each pair of side walls in the mounting structure comprises a leading side wall and a trailing side wall. Each cutting insert has a leading side wall surface and a trailing side wall surface, each of which is positioned in a cutter surface plane. One of the cutter surfaces has a wedging contact surface portion which deviates angularly from the plane of the side wall of the other cutter surface and positioned to come into bearing engagment with its realted wedging block portion in a manner to accomplish a wedging engagement therewith.

In a preferred configuration, the contact surface portion is formed as a recess in its related side wall surface. In one configuration, the contact surface portion is a planar surface portion, and in another configuration it is curved. Desireably, the contact surface portion which is in wedging engagement forms an angle of between about 5° and 20° with the side wall of the other cutter surface. Also, desireably the recess which provides the contact surface portion slants angularly from the other side wall surface in a radially outward direction.

In one modified form of the contact surface portion, there is a plurality of contact surface segments which are positioned relative to one another as spaced angular intervals. Thus, each cutting insert can be moved to different angular positions relative to its pocket, to position a selected contact surface segment in proper wedging engagement with its realted wedging block portion.

In one arrangement, each positioning arm engages it related wedging block portion to urge the wedging block portion radially outwardly and vertically, and the converging direction is radially outwardly and also vertically in the direction in which the related wedging block portion is urged.

The actuating portion in a preferred form comprises an actuating sub-assembly which comprises a central portion to which the actuating arms are connected. The outer ends of the actuating arms are movable to retaining positions from the central portion of the actuating sub-assembly. In one arrangement the wedging block portions are each connected to a related one of the actuating arms so as to be movable with its related actuating arm and to its retaining position. In another arrangement, the actuating arms are each separate from its related wedging block portion and is able to move into and out of engagement with its wedging block portion.

In a preferred arrangement, the movement of the positioning arms to and from the retaining position is caused by vertical movement of the central portion of the actuating sub-assembly along the axis of rotation. The actuating sub-assembly further comprises a linear actuating device operatively engaging the central portion of the actuating sub-assembly to move the central portion vertically.

In a preferred form, the linear actuating device comprises a screw member having operative engagement with the central portion of the actuating sub-assembly and operative engagement with the mounting structure. The screw member is arranged so that rotation of the screw member causes displacement of relative locations of the operative connections to the mounting structure and the central portion.

The screw member has threaded engagement with a threaded member that is in turn engaged and/or operatively engaged with the mounting structure.

The screw member in a specific form comprises a bolt member having a head and a threaded shank.

The head of the bolt is at a position which is spaced upwardly from a lower central portion of the mounting structure toward a reference plane which is perpendicular to the axis of rotation and extends through cutting locations of the cutting inserts when in their cutting position.

The mounting structure has a base portion by which the mounting structure can be connected to a drive member. The tool has a reference plane which is a plane generally perpendicular to the axis of rotation and extends through cutting edge portions of the cutting inserts at a location above the base portion. The central portion is positioned below the reference plane and is movable upwardly toward said reference plane to cause radially outward movement of radially outward portions of the postioning arms.

In one arrangement, each of the positioning arms is a resilient positioning arm which is able to deflect so as to yielding the urge related positioning and wedging portions to their retaining positions. Also, in a preferred form, each of the positioning arms is arranged to deflect resiliently in a vertical direction from the central portion of the actuating sub-assembly.

In one form, each of the arms has a leaf spring configuration, and more specifically, comprises a plurality of leaf springs.

Also, there is an auxilliary positioning spring which urges the actuating sub-assembly toward its retaining position with a force that is such as to permit the actuating sub-assembly to be deflected moderately to permit movement or replacement of the cutting insert. Also, the actuation portion is arranged so that the positioning arms are, in the retaining position, urged into wedging engagement with the positioning and wedging portions with a wedging force that is greater than the force which is provided by auxilliary positioning spring.

In one arrangement, each of the positioning arms is pivotally located to the central portion of the actuating sub-assembly so that vertical movement of the central portion of the actuating sub-assembly cause radial outward and inward movement of the positioning arms by movement of the positioning arms about their pirvot locations.

In one arrangement of the present invention, the actuating portion comprises a plurality of individual actuating devices, each of which engages a related postioning and wedging portion, and each being individually operable to move its related positioning and wedging portions into and out of its retaining positon, so that individual cutting inserts can be moved and/or removed.

In one arrangement, the individual actuating devices are each operatively connected to a related wedging block portion. In another arrangement, the actuating devices comprise spring means urging related wedging block portions into wedging relationship. In yet another arrangement, the actuating devices comprise cam means operatively connected to the wedging block in its related positioning and wedging portion.

In another particular arrangement, the actuating portion is resiliantly held in its retaining position, and there is resiliant deflecting means against which the actuation portion can be moved in a direction away from its retaining position. Thus, the actuating poriton can be moved to reduce force of wedging engagement of the cutting inserts to allow movement and/or removal of the cutting inserts.

In one form, the side walls of the mounting portion have a vertical directional component in addition to the radial directional component. More specifically, in one embodiment the vertical directional component is directed upwardly in the direction of the reference plane.

Other features of the present invention will become apparent from the detailed description.

BRIEF DESCRIPTION OF THE DRAWINGS

FIG. 33 shows a further modification where the actuating spring arm is in the form of a rod;

FIG. 34 shows a further embodiment of the present invention where there are auxiliary positioning springs urging the actuating member upwardly into its retaining position;

DETAILED DESCRIPTION OF THE PREFERRED EMBODIMENTS

Figure 1:
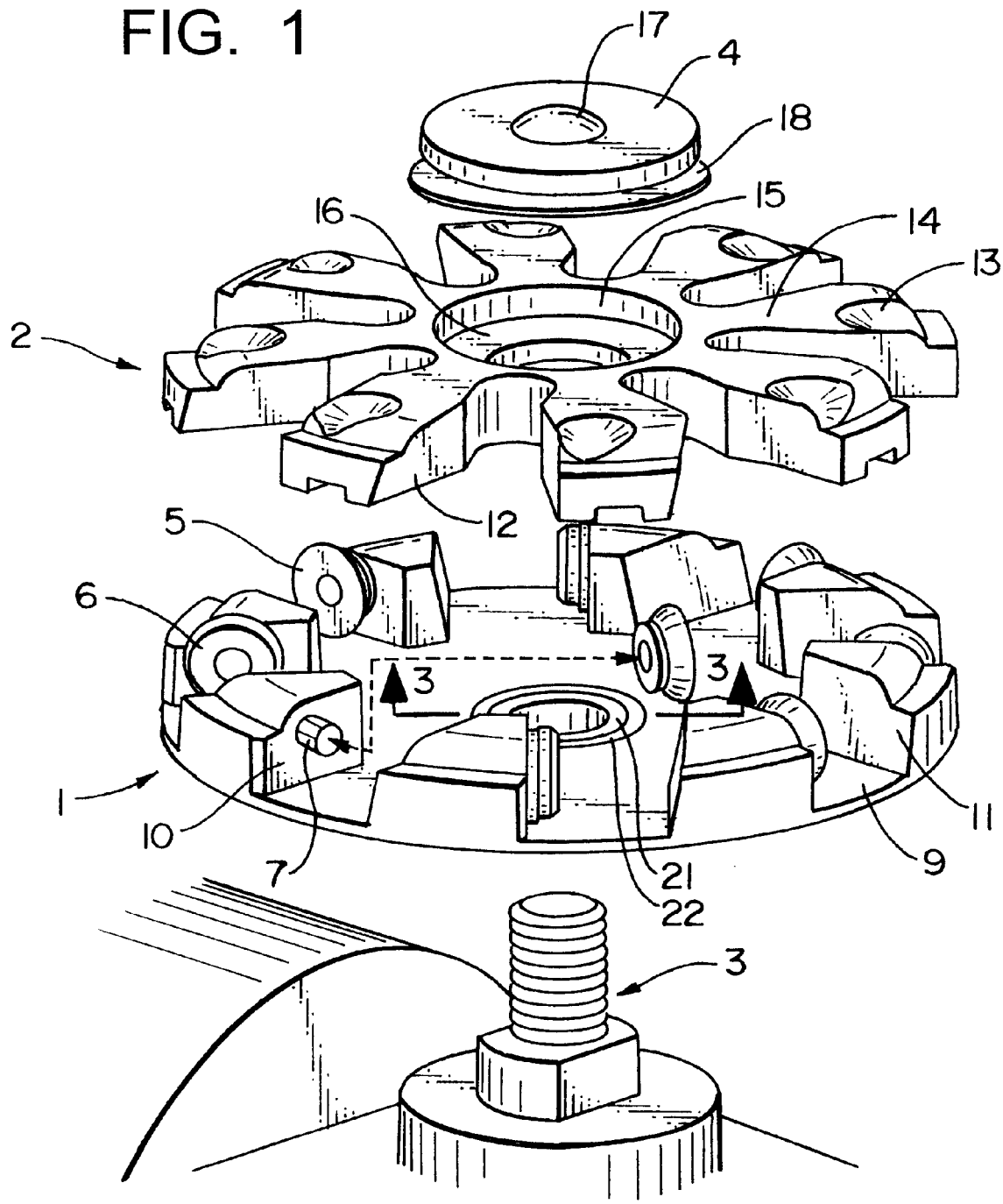
FIG. 1 shows a three-dimensional exploded front elevation showing the relative position of all parts of the disassembled cutting tool of a first embodiment.
Figure 2:
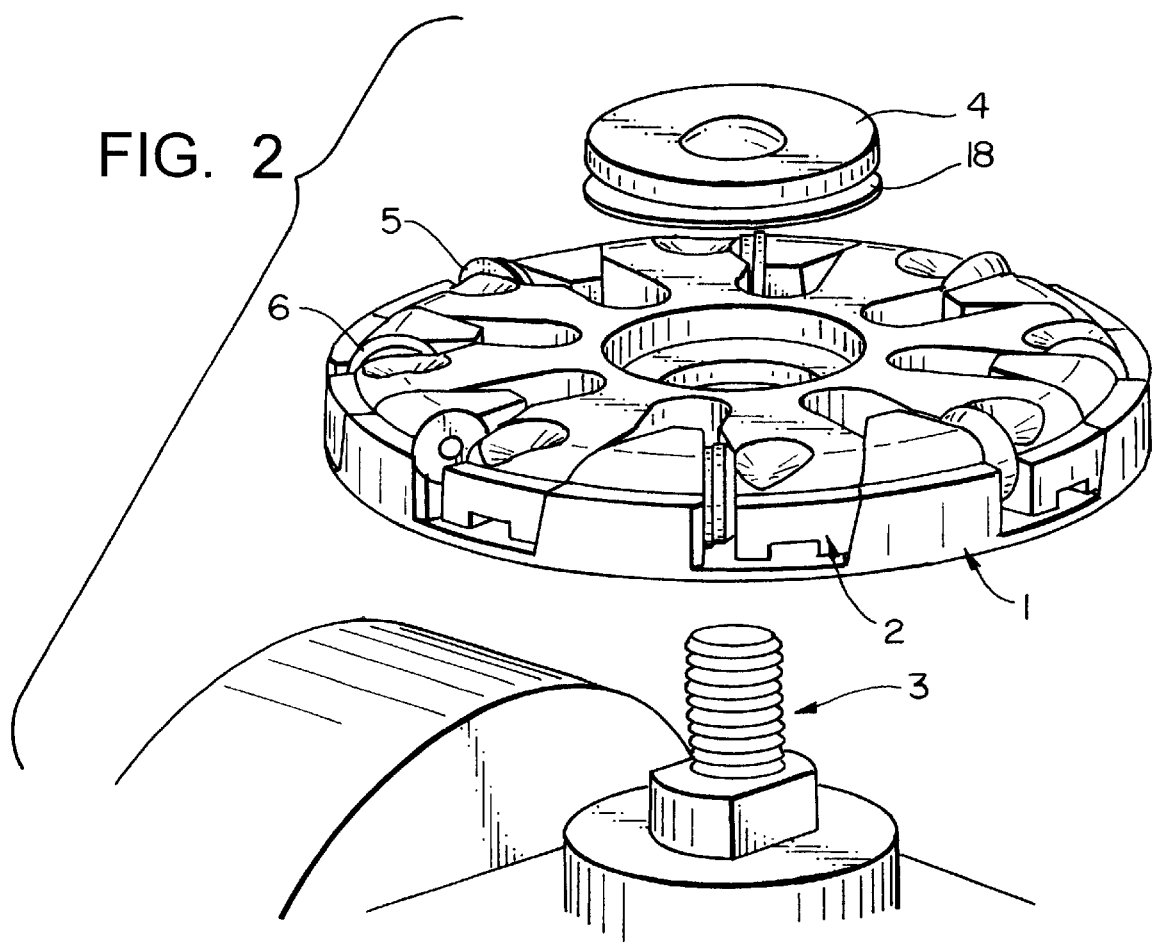
FIG. 2 shows a three dimensional view of the assembled tool as it would be mounted on a commercially available hand held power unit.
Figure 3:
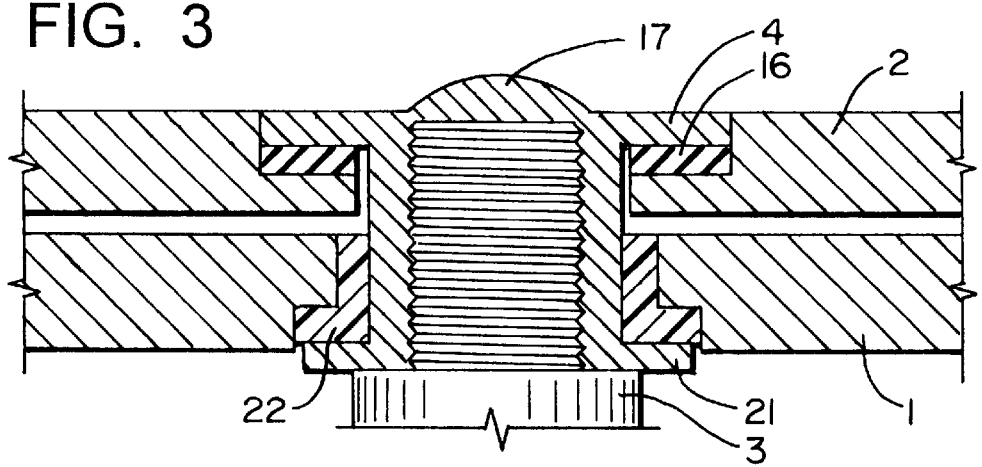
FIG. 3 shows a cross-sectional view of an assembled face planing head through the center of rotation.
Figure 4:
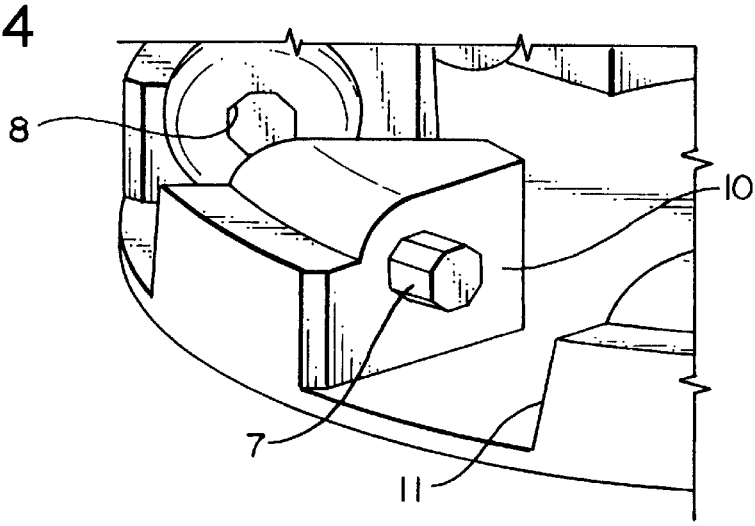
FIG. 4 shows a detail view of the cutting insert mounting pocket featuring an octagonal cutting insert positioning and indexing pin.
Figure 5:
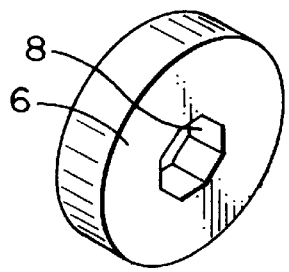
FIG. 5 shows a three-dimensional front elevation of a round plunge limiter.
Figure 6:
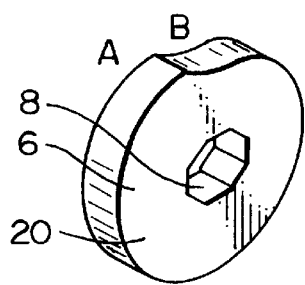
FIG. 6 shows a three dimensional front elevation of an eccentric-shaped plunge limiter.

A typical embodiment of the cutting head is illustrated in FIGS. 1 through 7. FIGS. 8 through 12 illustrate alternate features of the invention. The disassembled face planing head is illustrated in FIG. 1. The assembled face planing head is illustrated in FIG. 2. The face planing head consists of a cutting insert mounting structure 1, and a cutting insert holding member 2, mounted on a power unit 3 and secured by a shaft nut 4. Cutting inserts 5 and optional plunge limiters 6 are held securely in place by the blocking action of the cutting insert holding member and indexing and positioning pins 7. These pins may have a polygonal cross section; e.g., octagonal. Matching centering holes 8 in the plunge limiters and cutting-inserts are toleranced to allow a slip fit over the centering pins. The plunge limiters 6 and cutting inserts 5 are preferably mounted alternately on the cutting insert mounting structure 1, although other arrangements are permissible. On some embodiments of the tool plunge limiters are not necessary. Cutting insert mounting structure 1 is substantially disk-shaped and consists of a series of cutting insert mounting pockets 9 positioned around the outer circumference of the disk. Each pocket has two opposing surfaces. One surface 10 is positioned normal or at a slight angle to the plane of the disk and basically on an offset of the radial centerline of the disk. The integral and stationary cutting insert indexing and positioning pin 7 is mounted perpendicular to trailing surface 10. When a cutting insert 5 or plunge limiter 6 is installed on indexing and positioning pin 7, a small portion of the diameter of the insert or limiter is exposed on the working surface of the tool. Opposing leading surface 11 is positioned generally parallel to the surface 10 but canted away in an axially aligned direction toward the top, forming a wedging surface to interact with an identical and opposite faces on the cutting insert holding member. This wedges the inserts into place as the star member is forced closer to the cutting insert mounting structure by tightening of shaft nut 4 on power unit 3, with each pair of the surfaces 10 and 11 thus acting as a pair of wedging surfaces.

Cutting insert holding member 2 preferably is one piece and is designed to interact with a cutting insert mounting structure 1. This allows mounted cutting inserts 5 and plunge limiters 6 to be held securely in place on their centering pins 7 when the head is assembled and secured by shaft nut 4. This is accomplished by a wedging action resulting from the communication between the angled faces 11 incorporated into cutting insert mounting structure 1 and faces 12 on cutting insert holding member 2. The face 10 adjacent the cutting insert may or may not be planar, depending on the particular configuration of the insert. Alternatively, the cutting inserts 5 can be mounted on the leading surface 11, being held securely in place by the wedging or blocking surfaces of the protrusion between trailing surface 10 and a surface on the cutting insert or depth limiter.

An optional chip relief groove 13 may be present to reduce unnecessary wear from chips in front of cutting inserts 5. The radial protrusions 14 on the cutting insert holding member are designed to deflect as needed during assembly so the position of the clamping surfaces can compensate for tolerance variations in the cutting insert mounting structure 1, cutting inserts 5, or plunge limiters 6. A relief 15 may be provided so that shaft nut 4 can be flush-mounted into the cutting insert holding member. A medium durometer rubber washer 16 may be positioned between the bearing surfaces of shaft nut 4 and cutting insert holding member 2. Rubber washer 16 cooperates with an elastomeric isolation member 22 in the cutting insert mounting structure to provide mechanical isolation between power unit 3 and cutting edges.

A high point center rest 17 consists of a dome-shaped axial protrusion at the center of rotation of the head, providing a positive resting point for the tool when it is in use. The height of this resting point can be adjusted by adding or subtracting washers 18 from beneath the bearing surface of shaft nut 4.

Cutting insert 5 may be frusto-conical in shape with 360° cutting edge 19 around its perimeter facing the direction of the cut. It may have a polygonal centering hole 8 at the axis of rotation for the purpose of: (a) holding the piece in place and for, (b) providing multiple independent rotational positions so that the edges can be reindexed when they become dull. Many other cutting insert shapes are permissible. A typical hand held application might require four plunge limiters and four cutting inserts mounted on the assembled cutting head.

There are two types of plunge limiter configurations for the face planing head:

(1) A wear-resistant eccentric-shaped plunge limiter 20 features a consistently increasing radial dimension between point "A" and "B" (FIG. 6), and octagonal centering hole 8 on the axis of rotation. The amount of cutting edge exposed to the cut, and therefore the aggressiveness of the tool, is adjusted by rotating the eccentric limiter (FIG. 6) around an indexing means such as octagonal cutting insert indexing and positioning pin 7.

(2) A concentric disk-shaped plunge limiter 6 (FIG. 5) may be used. The edge exposure of the cutting inserts are adjusted by exchanging sets of concentric plunge limiters. Several sets of plunge limiters can be made available. Each set has a unique radial dimension and the diameter of each set increases incrementally. Disk-shaped plunge limiters may have an indexing means such as octagonal centering holes 8 allowing them to be indexed around cutting insert indexing and positioning pin 7 to compensate for diameter loss as they wear during use. wear bushing 21, toleranced to allow a slip fit between the interior diameter of the bushing and the threaded shaft of power unit 3, is positioned at the rotational centerline of the cutting-insert mounting structure. Elastomeric isolation member 22 is positioned between center wear bushing 21 and the body of cutting insert mounting structure 1. The rim of cutting insert mounting structure 1 and the corresponding rim of cutting insert holding member 2 can effectively shield the edges of the cutting insert, making the tool non-aggressive and self-guarding from the top and sides.

In the example heretofore described, the invention is shown as an attachment for a portable grinder, using a commercial grinder spanner nut to secure the cutting insert holding member to the tool. It may also be adapted to any other rotating member, such as the spindle of a milling machine, for use with any other stationary or portable power unit using any other securing means. As a further example, the cutting insert holding member is shown with a wedged face that will cause the cutting insert holding member to rotate into cutting inserts as the shaft nut is tightened. Within the broader scope of the present invention, in other applications, a simple, non-wedged design could be utilized that blocks the cutting insert into place.

Figure 8:
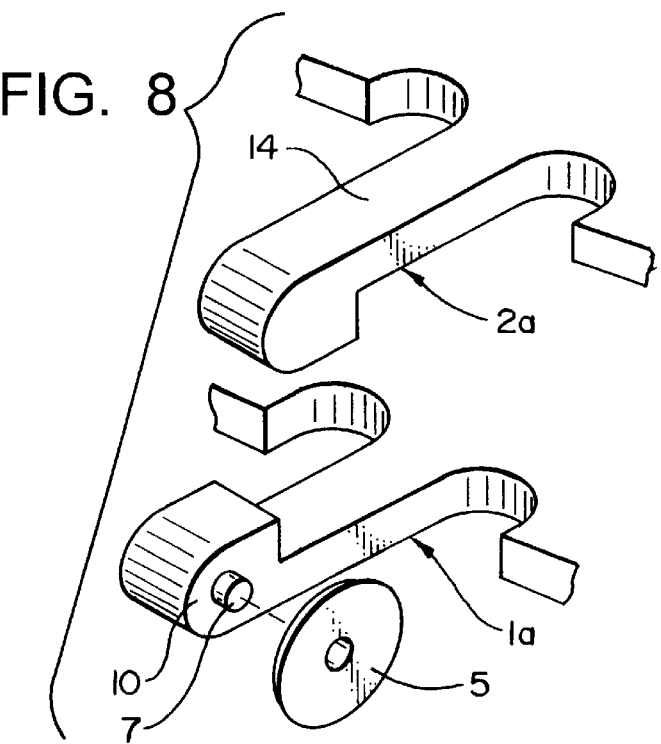
FIG. 8 is a partial perspective view of a slot cutting embodiment of the invention having two interfitting disk members.
Figure 7:
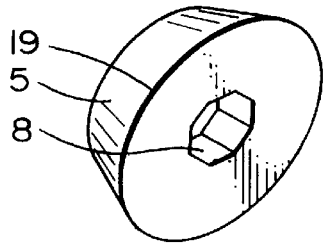
FIG. 7 shows a three dimensional front elevation of a cutting insert.

This invention should be considered to include within its scope other related configurations that accomplish similar results. These include rotating cutting tools that use two interfitting and substantially disk shaped members; e.g., as shown in FIG. 8. Here cutting insert mounting structure 1a and holding member 2a have been slightly modified so that the cutters can optionally extend beyond both faces of the structure and may also extend beyond the rim. The angle of a cutting edge may be altered for optimum performance in various materials. As an example, a substantial forward leaning position will cut some materials best and an angular variation relative to a radius of the cutting insert mounting structure may be beneficial. It should be understood that the angles of the cutting insert clamping surfaces would need to be adjusted accordingly.

Figure 9:
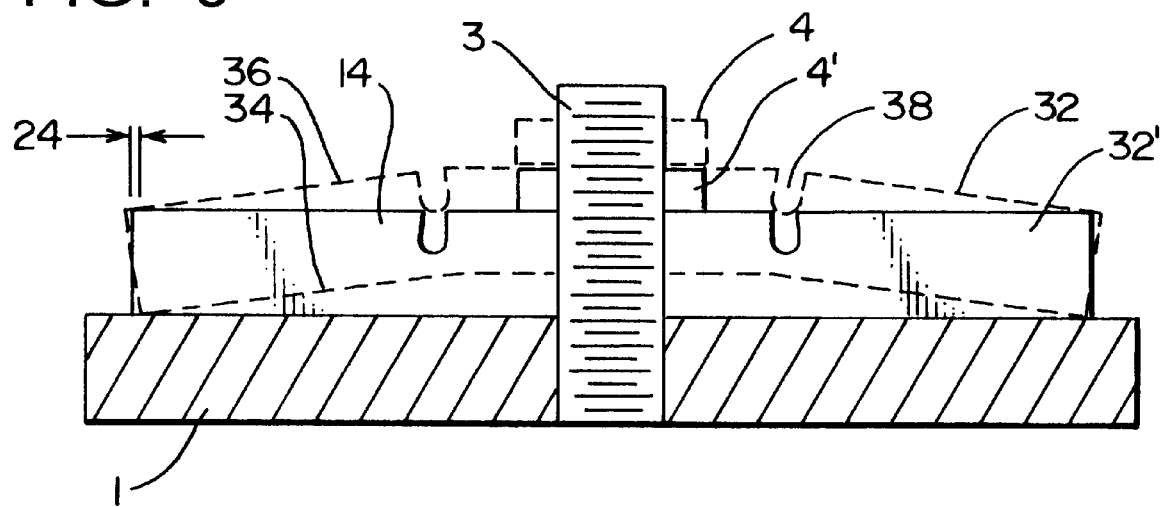
FIG. 9 shows a substantially frusto-conical dished second disk cutting insert clamping member having radially projecting protrusions being weighted such that the neutral axis is shifted when tightened for use.
Figure 11A:
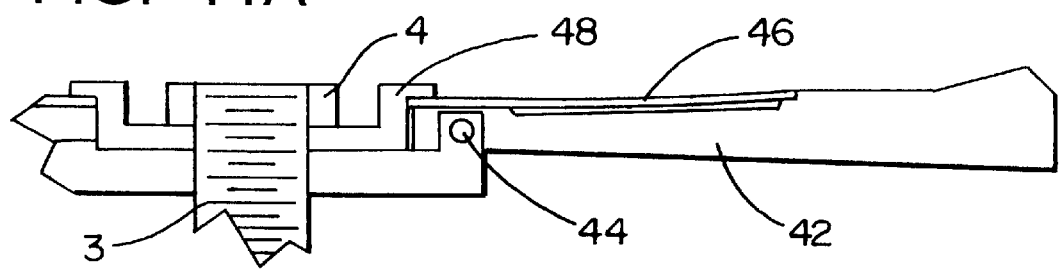
FIGS. 11a and 11b are fragmentary side elevations of alternative constructions for the cutting insert retainer.
Figure 11B:
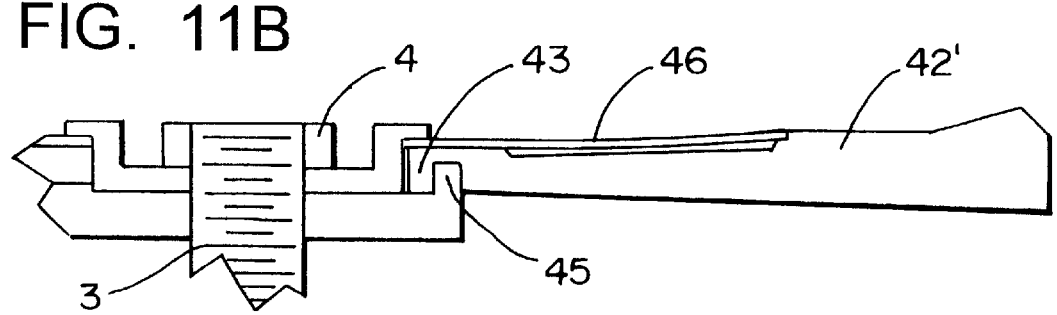

Another important structural variation is shown in FIG. 9 Here the cutting insert holding member 32, 32' has been modified so that the under surface 34 is slightly dished. The upper surface 36 may be machined correspondingly so that the thickness of the radial protrusions 14 remains substantially uniform. However, surface 36 may have features as shown in FIGS. 11A and 11B to allow improved clearance or to alter the radial deformation. The exact configuration of the lower surface 34 is not of critical importance. It has been found convenient to make it frusto-conical from ease of machining but other configurations; e.g., a surface corresponding to a segment of a sphere, are equally suitable. Hinge areas 38 are preferably provided on the radial protrusions and function as will now be explained. When the cutting insert holding member has been placed in position over the lower member it has the configuration shown in the dashed lines of FIG. 9. However, when the retaining nut 4 is tightened to position 4' to force the upper member down to jam the cutting inserts into place, the radial protrusions 14 are forced not only down but radially as well by a distance shown by 24. Hinge members 38 may be formed by decreasing the cross section of the radial protrusions. One way of doing this is by machining appropriate slots in the upper surface 36 of the radial protrusions or by otherwise reducing their cross sectional area. When retaining nut 4 is tightened to its operating position 4' the member 32 will be essentially flattened, as is shown by the solid lines of the figure. Alternatively, the protrusions on the second member may be made of an appropriate material such as spring steel that would not require a discreetly located hinge area. The protrusion may be flat or have an arcuate shape for improved axial and radial spring properties.

Figure 10:
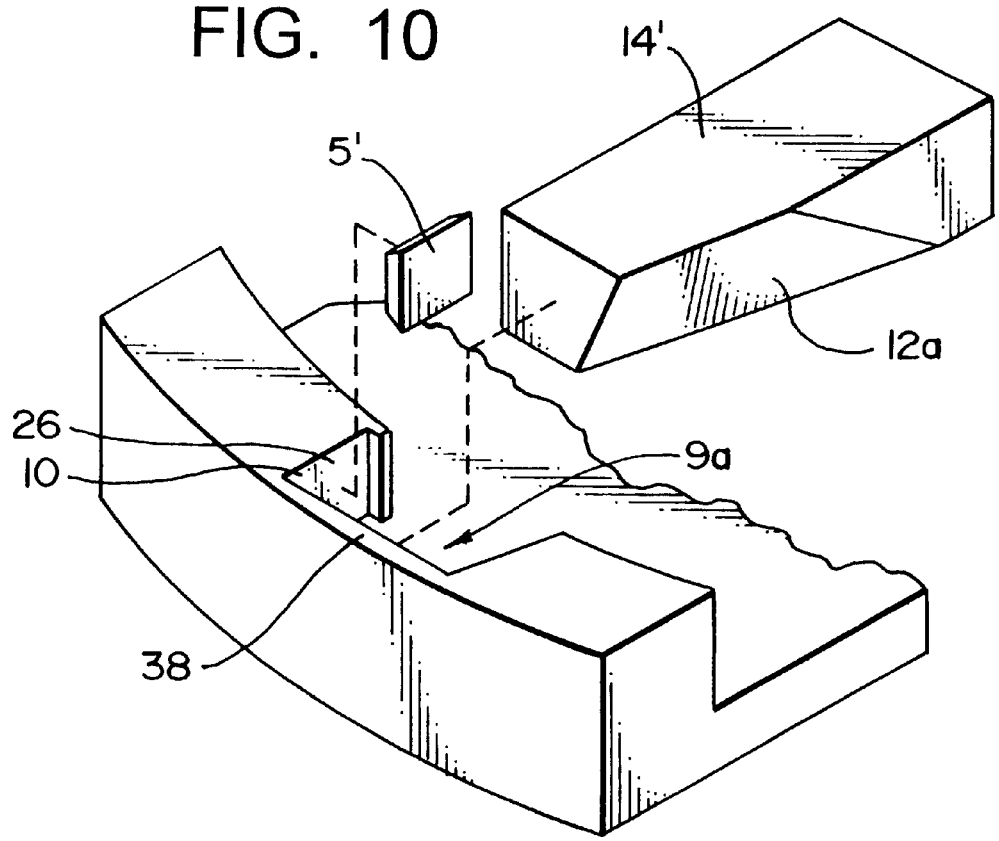
FIG. 10 is a fragmentary view showing a first disk shaped member having a non-segmented axially projecting rim comprising a blind cutting insert mounting pocket.

The means for positioning and indexing cutting inserts or plunge limiters is not limited to a center pin 7. Alternatively, a formed pocket 26 may be used to hold the cutter insert 5', as is shown in FIG. 10. Here cutting insert mounting pockets 26 are formed into blind pockets 9a by an axially projecting rim 38. This surface 12a is slanted with a moderate upward and forward slant and with a moderate radially outward and rearward slant, and also at an upward and forward slant. The distal surfaces, such as leading surface 12a of radial protrusion 14 may be modified as necessary to achieve the fit required. A cutting insert clamping member, such as is shown in FIG. 9, may be advantageously used with this construction. Using a clamping member of this type, the axial deflection causes the free ends of the radial protrusions to move tightly against the corresponding surfaces of the insert mounting pocket 9a and cutting insert 5'. Such radial movement causes increased wedging of the insert. Radial loads from centripetal acceleration may further deform the material of the protrusions, further increasing radial clamping forces on the inserts.

An alternative structure of the second member is shown in FIG. 11a. This is formed with a central base member 40 to which are attached separate protrusions 42 by hinge pins 44 or an equivalent hinging mechanism. The protrusions are biased downward by strong springs 46. The proximal ends of the springs are held in place by a retainer disk 48. As shaft nut 4 is tightened on power unit shaft 3 the protrusions are deflected radially to effect their strong wedging action on the cutting inserts. The hinge line would normally be located parallel to the plane of first member 1 and perpendicular to the centerline of the protrusion. For some purposes the hinge line may be canted up to as much as 45° although 10° to 15° would be more typical.

Another hinge construction for the protrusions is shown in FIG. 11B. Rather than using a hinge pin, the protrusion 42' has a hooked end 43 that rests on a pivot or fulcrum point 45 on base member 40. In FIGS. 11a and 11b the tools are shown with the arms 42 and 42' horizontally aligned in a position that hold the related cutting inserts firmly in place.

Figure 12:
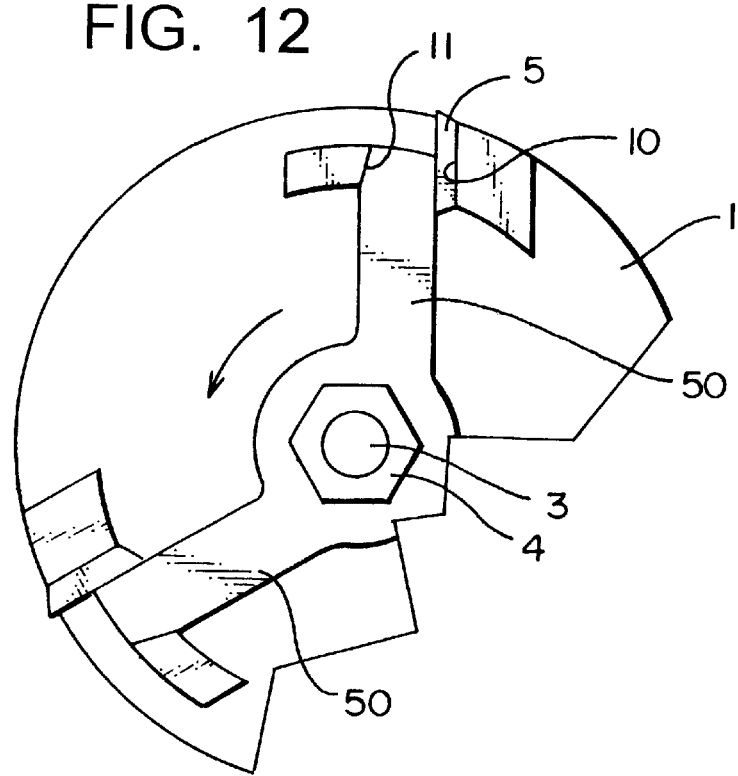
FIG. 12 is a fragmentary plan view of another alternative construction of the cutting insert retainer.

While the protrusions 14 of FIGS. 1 and 2 are shown lying along radial lines, this is not absolutely essential. As is shown in FIG. 12 the center line protrusions 50 are displaced from but lie parallel to a radial line. The displacement may either be leading or lagging a true radial line. The term "radial protrusion" should be read with sufficient breadth to encompass protrusions that are displaced as just described.

The invention comprises structures that contribute to powerful clamping pressures on the cutting inserts under static conditions that increase with radial loads resulting from centripetal acceleration. The weight distribution of the radially extending protrusions results in a shift in the neutral axis such that radial centrifugal forces acting on the protrusion cause a moment, forcing the free end of the protrusion toward the first disk shaped member increasing clamping forces on the cutting insert 5.

An elastomeric isolation member may be used to allow for self leveling of the tool. This is useful for successful adaptation of a non-flexible machine head to a hand-held application. A similar effect could be accomplished by manufacturing the cutting insert mounting structure and holding member from an elastomeric material without a separate bushing, or by the use of a metallic spring or mechanical articulating coupling instead of the elastomeric member shown. To gain certain manufacturing benefits, designing the first or second members in one or more component pieces may be a preferred method of construction. Either the first or second members may be manufactured as two or more interfitted components. For example, it may be desirable to machine the axially projecting rim from tubular material and join it to the body of the cutting head in any known manner to reduce the amount of machining necessary. Functionally, the members would still perform as unitary pieces.

Figure 13:
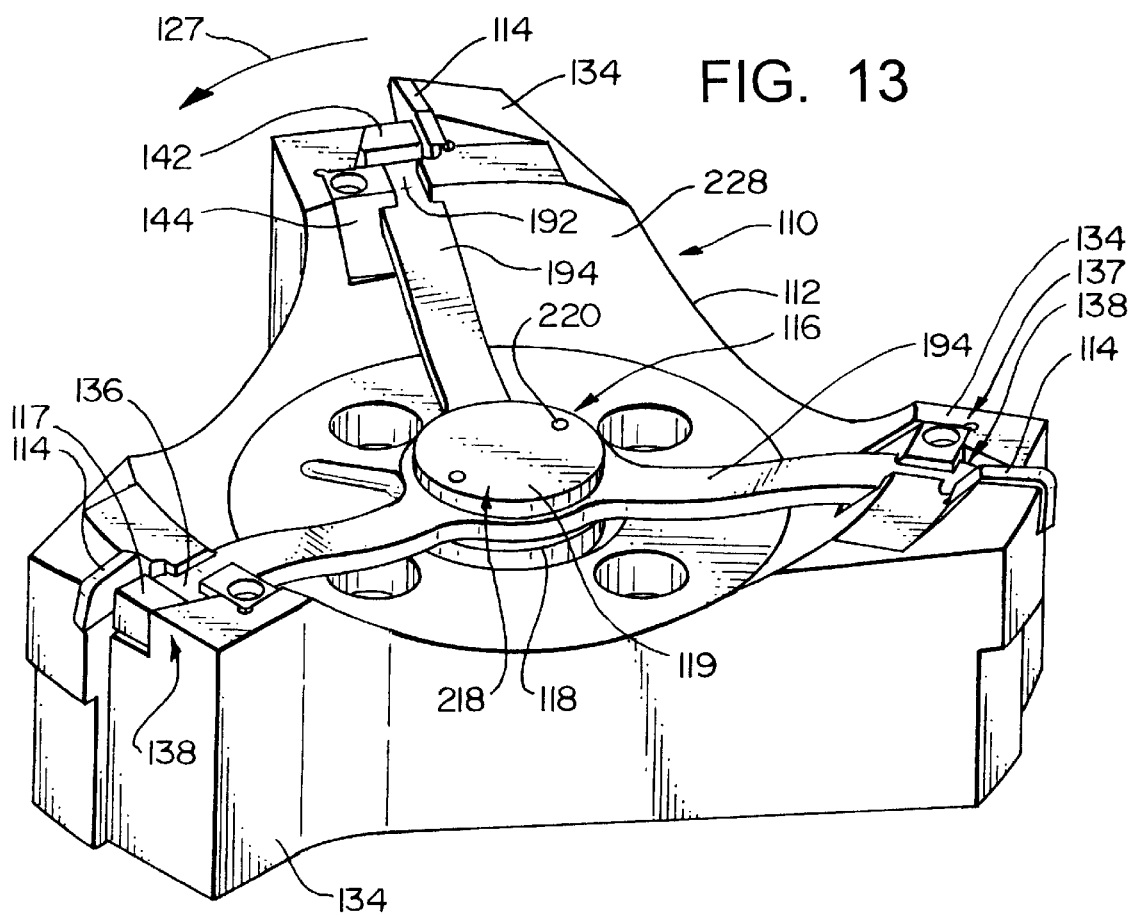
FIG. 13 is an isometric view of a second embodiment of the present invention showing the assembled cutting tool.

A second embodiment of the present invention will now be described with reference to FIGS. 13 through 22. As shown in FIG. 13, the cutting tool 110 of this second embodiment comprises a mounting member 112 which is adapted to receive a plurality of cutting inserts 114. The tool 110 also comprises a cutter insert holding assembly 116 which is mounted to the mounting member 112, and which in turn comprises a positioning and wedging sub assembly 117 (to be described in more detail later herein) and an actuating sub assembly 118. In this particular embodiment this actuating sub assembly comprises a center bolt assembly 119 (See FIG. 14) which is positioned at the center of the mounting member 112. This bolt assembly 119 connects the holding assembly 116 to the mounting member 112, and (as will be described later herein) functions to help retain the cutter inserts 114 and the cutting tool 110.

For purposes of description, the tool 110 shall be considered as having a center axis of rotation 120 which coincides with an longitudinal center axis of the bolt assembly 118. Also, the tool shall be considered as having a reference plane 122 which is coincident with the edge of the cutters 114 (mounted in the tool 110) and which is perpendicular to the axis of rotation 120.

The term "upward" denotes a direction from the reference plane 122 indicated by the arrow 124 that is away from the mounting member 112, and the term "downward" denotes the opposite direction, as indicated by the arrow 126.

The term "inner" or "inward" denotes a direction toward (or in proximity to) the center axis 120, and the term "outer" or "outward" denotes a direction radially away from the center axis 120 or a location further from the axis 120.

With reference to FIG. 13, the cutting tool 110 rotates in a counter clockwise direction (as seen in FIG. 13, and as indicated by the arrow 127). The terms "leading" (or forward) and "trailing" (or rear) shall denote relative positions where the "leading" location is in a more forward direction (with reference to the direction of travel as indicated by the arrow 127), and the term "trailing" shall denote a further rearward direction relative to the direction of travel 127.

The mounting member 112 is formed as a single solid metal piece, without moving parts. This mounting member 112 comprises a central portion 128 having a central threaded opening 130 aligned on the center axis 120. The mounting member 112 also has a perimeter portion 132 which, in this preferred embodiment, comprises three mounting sections 134, which are formed as radially outward protrusions spaced angularly from one another by 120°. The outer upper part of each mounting section 134 is formed with a pocket 136 to receive a related cutting insert 114, and also components of the cutter insert holding assembly 116 that hold the cutter insert 114 in place. The holding assembly 116 comprises a positioning sub assembly 137 which in turn comprises three positioning and wedging portions 138, each of which is positioned within a related pocket 136.

Figure 15:
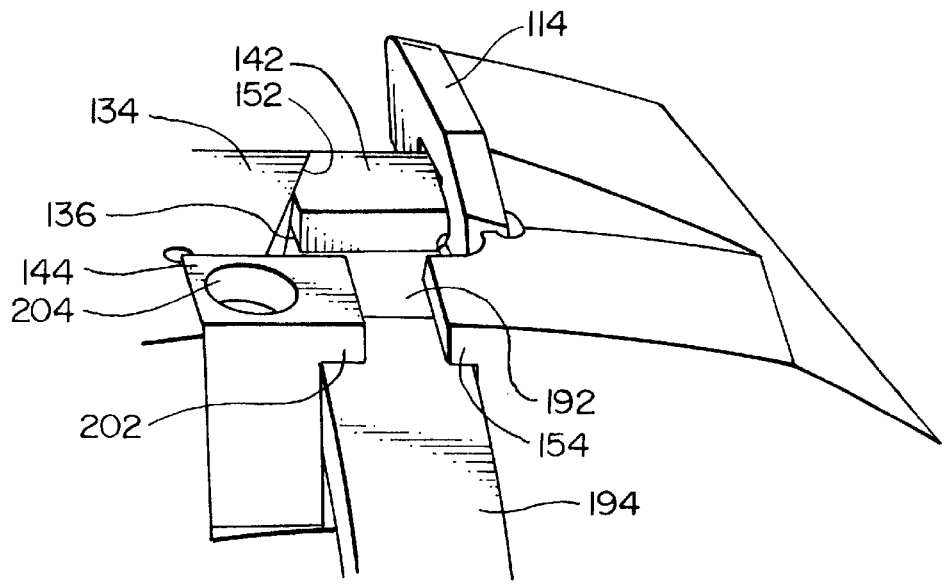
FIG. 15 is an isometric view of one of the mounting sections and its related positioning and wedging subassembly, as viewed looking downwardly and radially outwardly.
Figure 16:
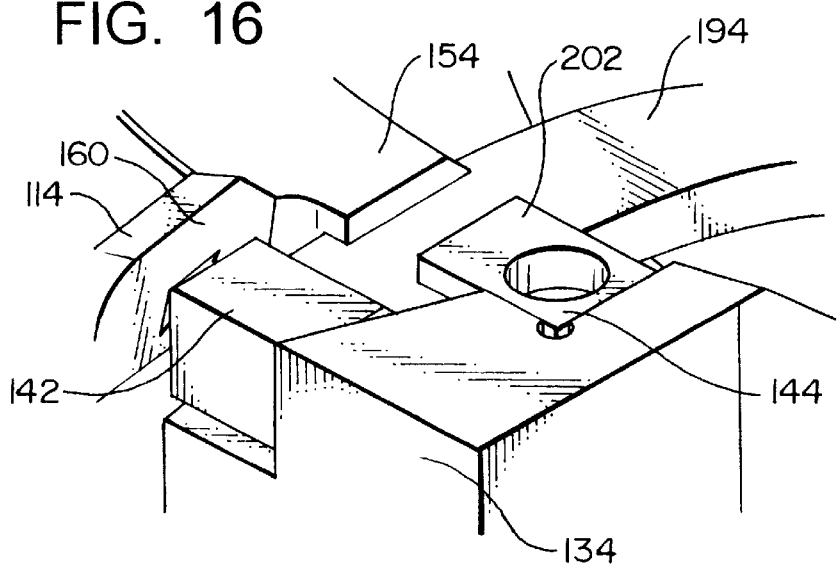
FIG. 16 is a view similar to FIG. 15, but taken from an outer location and looking radially inwardly and rearwardly, relative to the direction of rotation.
Figure 17:
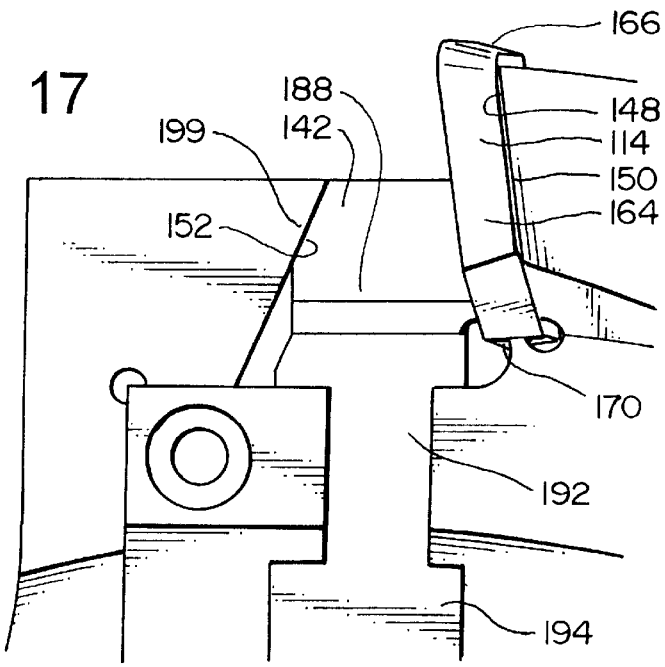
FIG. 17 is a view similar to FIGS. 15 and 16, but looking downwardly.

To describe the three positioning and wedging portions 138 and their associated components, reference is made to FIGS. 15 through 17 which show one of these portions 138 assembled and in its operating position, and FIGS. 18 through 23 which show the various related components separately. There is shown in FIGS. 18 through 22 the aforementioned pocket 136 (FIG. 18), one of the cutter inserts 114 (FIG. 19), a clamping block 142 (FIG. 20), also called a "wedging block", which (as its name implies) holds the cutter 114 in place in the pocket, a retaining member 144 (FIG. 21) to hold a related spring arm in place, and a spring retaining member 146 (FIG. 22) which is part of the cutter insert holding assembly 116.

Each pocket 136 is generally radially aligned, and it is defined by a trailing generally radially, outwardly and forwardly slanted cutter positioning and wedging surface 148 against which a back face 150 of the cutting insert 114 is positioned, and the other which is an opposed leading wedging surface 152 which is generally radially aligned, but is slanted radially outward in a rearward direction toward the trailing pocket surface 148. Thus it can be seen that wedging surfaces 148 and 152 converge in a converging direction which has a substantial radially outward alignment component. Each mounting section 134 is provided with a rearward overhanging retaining lip 154 radially inwardly of the trailing mounting surface 148 and projecting forwardly. Opposite to the lip 144 there is a recessed portion 156 in the pocket 136 to receive the retaining member 144. The pocket 136 has a lower surface 158.

Figure 18:
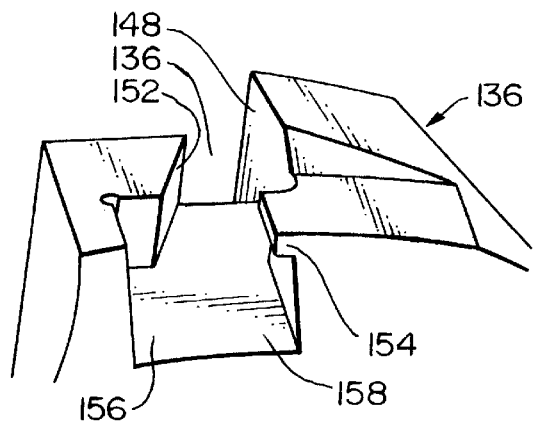
FIG. 18 is an isometric view showing the pocket portion of one of the mounting sections.
Figure 18A:
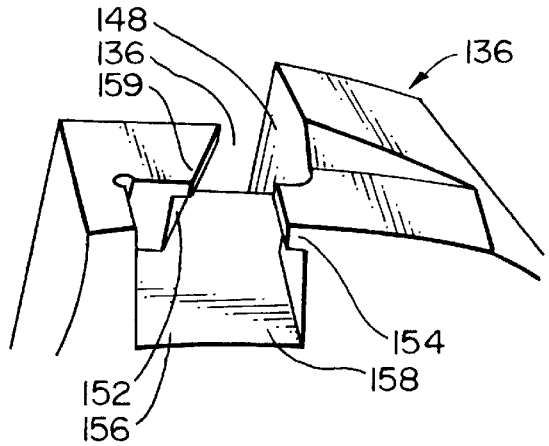
FIG. 18a shows a modified form of the pocket shown in FIG. 18.
Figure 19:
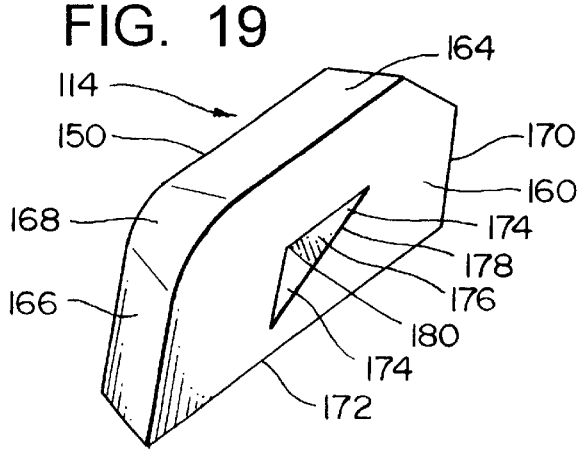
FIG. 19 is an isometric view of one of the cutter inserts.
Figure 23:
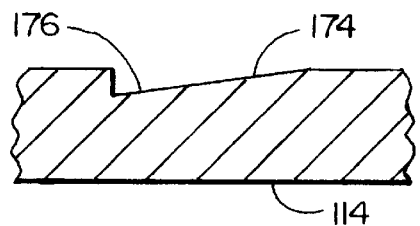
FIG. 23 is a sectional view of a retaining recess of the cutting insert showing the slope of the contact surface.
Figure 20:
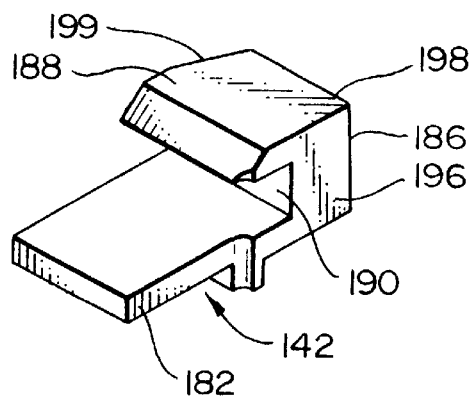
FIG. 20 is an isometric view of one of the mounting blocks.
Figure 22:
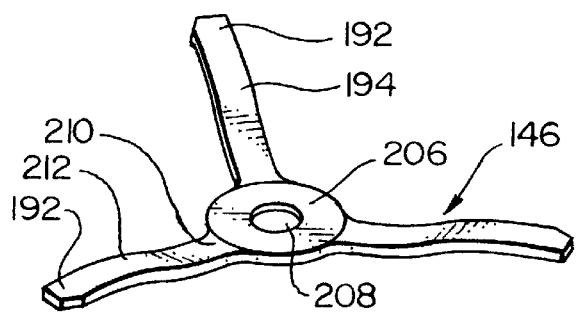
FIG. 22 is an isometric view of the spring retaining member.
Figure 21:
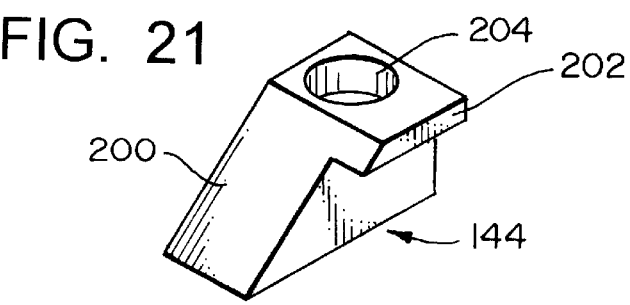
FIG. 21 is an isometric view of a retaining member of the positioning and wedging subassembly.

FIG. 18a is substantially the same as 18, except that there is an overhanging lip 159 which is positioned to be immediately above the leading portion of the wedging block 142. When the wedging block 142 is moved outwardly in the pocket 136, this lip 159 limits the upward movement of the block 142 so that it will move into the proper wedging position. Also, in the configurations where the two wedging surfaces 148 and 152 converge in a vertical direction, if the block 142 is positioned radially inwardly of its retaining position, this lip 159 will assist in guiding the block forwardly to its proper retaining position to be in proper wedging relationship with regard to vertical wedging action as well radial outward wedging action.

Each cutter insert 114 has a generally rectangular configuration and comprises a front surface 160 which is positioned oppositely to its aforementioned back surface 150. The insert 114 also has a radially outward surface 162 and a top surface 164, with the surfaces 162 and 164 being joined by a rounded upper and outward corner portion 168. Also there is a back surface 170 and a bottom surface 172.

The cutter insert 114 is formed at a generally central location on its front surface 160 with a generally triangular shaped retaining recess 174 which comes into engagement with the related part of the clamping block 142. This recess 174 has a slanted contact face 176 (See FIG. 23) which slants from the lower upwardly and rearwardly slanting edge 178 in a moderate rearward slope toward an apex location 180. This recess 174 becomes deeper from the line 178 toward the apex point 180. Thus, the contact face 176 functions as a wedging and positioning surface which slopes radially outwardly and somewhat upwardly toward the back bearing surface 150 so as to have a wedging action from the back surface 150 and the contact surface 176.

The clamping block 142 (see FIG. 20) has a lower block portion 182 that extends radially inwardly and fits against the lower surface 158 of the pocket 136, a forward portion 186 that is radially outward, and an upper radially inward extending portion 188. The block portions 182 and 188 define a radially inward facing recess 190 which receives an outer end portion 192 of a related spring arm 194 of the spring retaining member 146. Thus the recess 190 and end portion 192 (which protrudes into the recess) forms a protrusion/recess connection. The radially outward portion 186 of the block 142 has a trailing surface 196 which has an upper radially outward corner 198 which fits in the aforementioned recess 174 to bear against the contact surface 176 and the cutter insert 114 (see FIG. 19).

The radially outward portion 186 of the mounting block 142 has a slanted leading surface 199 which has a radially outward and rearward slant which matches the slant of the aforementioned wedging surface 152 of the pocket 136 (see FIG. 18).

The retaining member 144 has a main body portion 200, and a retaining lip 202 which extends rearwardly from the upper part of the body portion 200. This retaining lip 202 cooperates with the aforementioned lip 154 formed on the mounting section 134 to properly position a related one of the spring arms 194. The retaining member 144 has a vertical through opening 204 to receive a bolt so that it can be secured to the mounting section 134.

The spring retaining member 146 is part of the actuating sub-assembly 118 and comprises a central portion 206 having a disk-like shape with a central through opening 208 so that it may be secured to the bolt assembly 119. As indicated previously, this retaining member 146 comprises the three spring arms 194 which are angularly spaced from one another by 120° and extend radially outward from the center portion 206. Each arm 194 has a radially inward mounting portion 210 and an upwardly and radially extending transition portion 212 which joins to the aforementioned outer end portion 192. As will be described later herein, the retaining spring member 146 is positioned in the mounting member 112 so that the central portion 206 can be moved upwardly by the bolt assembly 119, to cause the three retaining arms 192 to extend their end retaining portions 192 outwardly to urge each of its related mounting blocks 142 radially outwardly and cause the wedging action of the retaining member 142 to hold the related cutter insert 114 in place.

Figure 14:
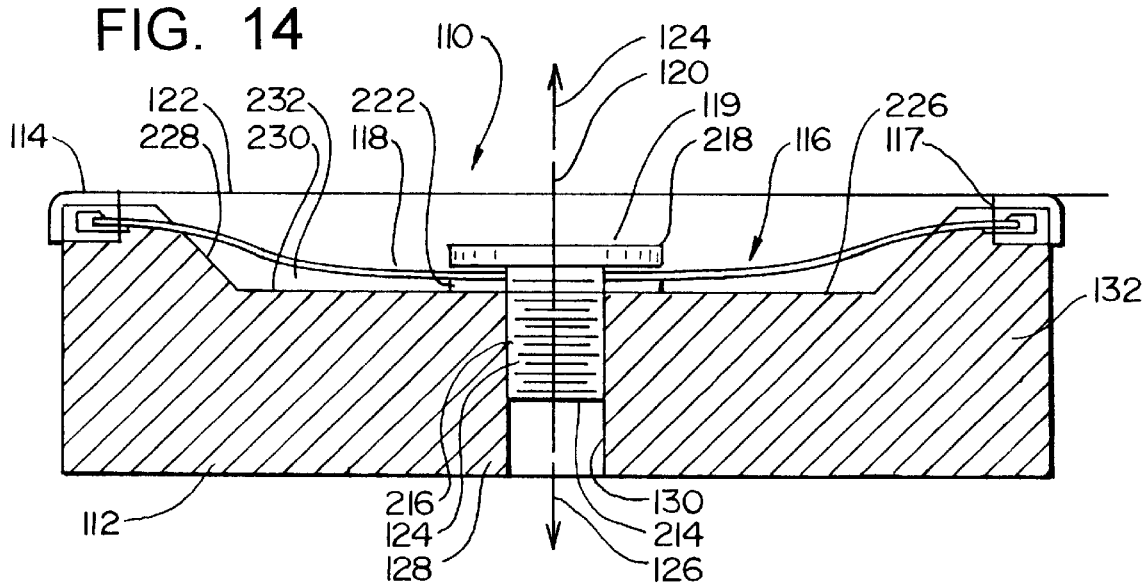
FIG. 14 is a sectional view taken along the longitudinal center axis of rotation, with a section being taken parallel to two of the retaining arms.
Figure 14A:
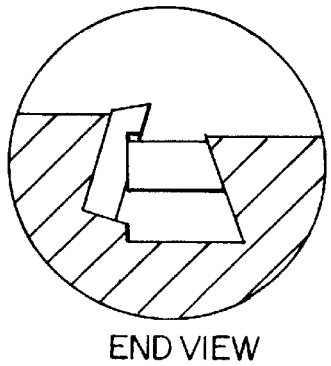
FIG. 14a is an end view of one of the cutter assemblies.

Reference is now made to FIG. 14. The aforementioned bolt assembly 118 comprises a bolt 214, which is threaded into the aforementioned threaded opening 130. The bolt 214 has a main shank 216, and an upper bolt head 218 provided with diametrically opposed spanning holes 220 which are able to be engaged by a spanning wrench to rotate the bolt 214. The head 218 of the bolt 214 fits just above the central portion 206 of the spring retaining member 146, and there is a positioning collar 222 mounted around the bolt shank 216 just below the retaining member central portion 206. This collar 222 is axially fixed to the shank 216 so that as the bolt 214 is rotated so as to move upwardly and downwardly in its hole 130, the collar 222 likewise moves upwardly and downwardly. Thus, it can be seen that in the position of FIG. 14, as the bolt 214 is rotated so as to be moved upwardly, the collar 222 will move the central portion 206 of the retaining spring member 146 upwardly. In like manner, when the bolt 214 is moved in the opposite direction, the central portion 206 of the spring retaining member 146 moves downwardly.

As indicated previously, the main mounting member 112 is, in the preferred form, a unitary metal block or member having a central portion 126 and three mounting sections 134. Alternatively the mounting member 112 could be made as several sections joined to one another. The central mounting portion 128 has an upper surface 226 which has an overall recessed or "bowl-like" configuration where the mounting sections 134 each have a radially upward and outward slanting surface 228, and the central part 128 of the mounting member 112 has a lower flat surface portion 230. The spring retaining member 146 fits within the recessed area 232 with its central portion 206 positioned at a lower location, and its arm end portions 192 positioned at a higher location.

The manner in which the cutting tool 110 is assembled will now be described.

The spring retaining member 146 is connected to the bolt assembly 118, and the bolt 214 is threaded into the hole 130 so that the bolt assembly 118 is at a lower location, as shown in FIG. 14. Each of the three arms 194 of the spring retaining member 146 is aligned with a related mounting section 134 of the main mounting member 112. With the bolt assembly 118 in its lower position, the three retaining arms 194 have their outer ends 192 at a relaxed radially inward position.

Then the three cutter inserts 114 are each positioned in a related pocket 136 as shown in FIGS. 15 through 17, so that the back surface 150 of each cutter 114 is positioned against the trailing mounting surface 148 in the pocket 136. Each clamping or wedging block 142 is positioned in the pocket 136 so that the slanted wedging surface 199 is in contact with the matching wedging surface 152 of the pocket 136, and also so that the contact corner 198 is positioned in the related recess 174 on the front surface 160 of the cutting insert 114. The outer contact end portion 192 of the related spring arm 194 is positioned in the pocket 136 and so as to be above the lower mounting block portion 182 and below the retaining portion 186, thus fitting within the recess 190 of the clamping block 142.

The three retaining members 144 are each positioned so that the retaining lip 202 is opposite the retaining lip 154 in the mounting section 134. As indicated above, each retaining member is retained in place by a suitable bolt extending through the hole 204.

With the above steps being accomplished, the cutting tool 110 is assembled, and the next step is to raise the bolt assembly 118 to properly secure the positioning and wedging subassemblies 136 in their secured position, holding the related cutter insert 114 securely in place. It can be seen, with reference to FIG. 14, that as the bolt 214 is rotated to raise the bolt head 218 and the collar 222, thus raising the spring retaining member center portion 206, the spring arms 194, with their end portions 192 positioned in the related subassembly 138, press the related mounting block 142 outwardly so that the wedging engagement with the surface 152 causes the mounting block corner 198 to press against the contact surface 176 of the recess 174 in the cutting member 114. The contact surface 176 is slanted so that the net force of the corner 198 of the clamping block 142 results in a wedging action of the surface 150 of the cutting insert and the contact surface 176. This action, along with the action of the wedging block 14, holds its related cutter 114 securely in place.

With this being accomplished, then the mode of operation of the cutting tool 110 is substantially the same as described previously herein.

Two modified forms of the cutting insert are illustrated in FIGS. 24a, 24b, 24c and 24d. The cutting insert 114a has substantially the same configuration as the aforementioned cutting insert 114. However, instead of having a triangularly shaped recess 174 with the slanting surface 176, there is a concave recess 236 which has a curved dish-like shape, and as shown herein with a spherical curvature. The point of engagement of the clamping corner 198 of the clamping member 142 is selected so as to have the proper angular engagement relative to the surface of the recess 236.

Figure 24A:
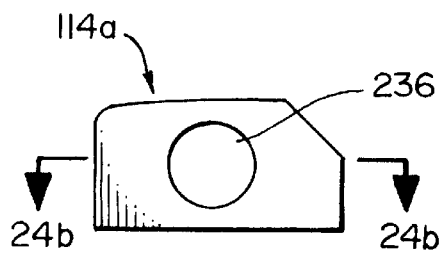
FIGS. 24a and 24b are side and top views of a modified cutting insert.
Figure 24C:
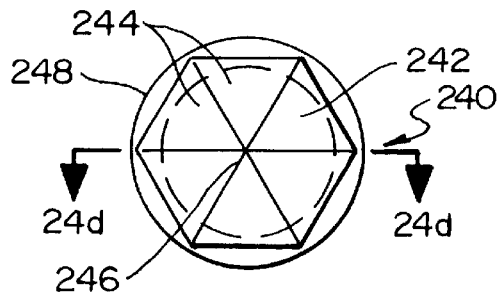
FIGS. 24c and 24d are views similar to FIGS. 24a and 24b, showing another modified cutting insert.
Figure 24B:
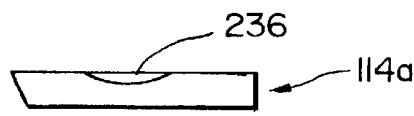
Figure 24D:
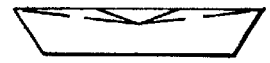

FIGS. 24c and 24d show a modified form of the cutting insert, this cutting insert being designated 240. It has an overall cylindrical configuration, and there is a recess 242 formed in the contact face of the cutting insert 240. The recess 242 has a generally pyramid-type configuration, comprising six triangular recess sections 244, meeting at a center apex point 246. At any one time, one of the recess sections 244 is positioned so as to come into contact with the related clamping block. The cutting insert 240 can be rotated to six different locations, so that six different portions of the cutting edge 248 could be positioned in the cutting position.

Figure 25:
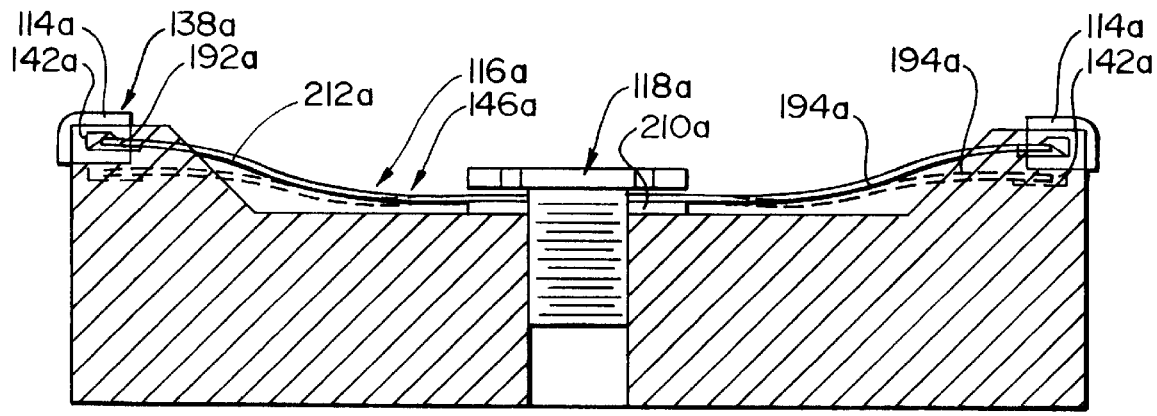
FIG. 25 is a sectional view, similar to FIG. 14, showing a modified form of the holding means.

A modified form of this second embodiment is shown in FIG. 25, which is a cross sectional view such as shown in FIG. 14. Components of this modified version will be given numerical designations such as those in the second embodiment, but with an "a" suffix distinguishing those of this modified version of the second embodiment.

Figure 25A:
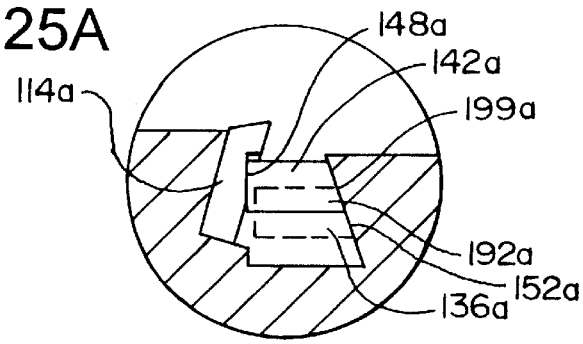
FIG. 25a is a drawing of the positioning and wedging subassembly of FIG. 25, taken along a section line transverse to a radially extending line from the center of rotation and looking radially outwardly.

As in the arrangement shown in FIG. 14, there is the bolt assembly 118a which is the same as the bolt assembly 118 of FIG. 14, and also, there is the cutter insert holding assembly 116a having the spring retaining member 146a. The positioning and wedging sub-assembly 138a is modified in a manner that the contact surface 148a and the wedging surface 150a, instead of slanting only in a radially outward direction, also slant in an upward direction, as seen in FIG. 25a. Also, the slanted leading surface 199a of the clamping block 142a is slanted in an upward and rearward direction to match the slant of the wedging surface 152a.

The arms 194a are spring loaded so that the arm end portions 192a spring upwardly. Thus, with the arm end portions 192a positioned in the related clamping block 142a, each clamping block 142a is urged upwardly and radially outwardly into its clamping position.

In FIG. 25, the arms 194a are shown in broken lines where they have been pushed to a downward position. This could be accomplished, for example, by having a tool engage the outer portion of the arm 142a and pushing it downwardly while the cutting insert 114a is placed in its proper position. Then when the spring arm 194a is released, it moves up to the solid line position, as shown in FIG. 25, to press the mounting block 142a into wedging engagement in the pocket so as to hold the cutting insert 114a in place.

The overall operation of the tool with the modified components shown in FIGS. 25 and 25a operate in substantially the same manner as the tool of the prior embodiments, once the tool is assembled.

Also, it is to be understood that the holding member, instead of having several components, may be a single structure with spring or spring hinged protrusions or a multiple leaf spring that essentially functions as a single structure. The multiple leaf springs may be of different thickness' and lengths so that the overall spring characteristics of the protrusion can be specifically designed for certain applications.

Also, it is to be understood that a distinct clamping surface, such as shown at 176 may not be required, depending upon the design of the cutter. If a distinct clamping surface is used, other structures are anticipated, including, but not limited to, planar or curved surfaces or an array of planar or curved surfaces that protrude from a surface of the cutting insert of various planar or curved indents.

The second embodiment provides improved center clearance, reduced cost of manufacturing, and improved insert handling characteristics while maintaining the radial clamping characteristics of the previously described mechanism. This embodiment teaches a concave surface positioned away from the body of the insert mounting member. By this means, clearance is created between the center of the tool and the work without requiring specifically machined contours on the second clamping member making it possible to manufacture said second member from sheet material instead of by machining thereby saving manufacturing cost and possibly improving the spring properties. This configuration provides for individual deformation of arms 194 of holding assembly 116 so that insert can be removed individually without disturbing the other inserts. This is important because single inserts can be individually damaged in use.

Also, within the broader scope of the present invention, the positioning arms 194 could be moved outwardly and inwardly in a variety of ways, such as by cam surfaces, rotational movement or other means.

These will now be a description of further embodiments or modifications.

Figure 26:
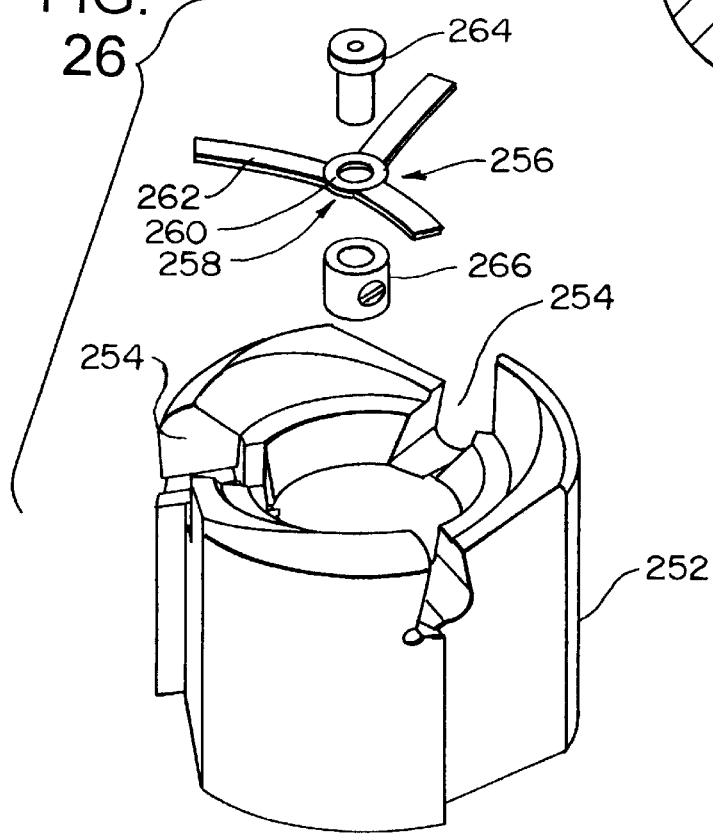
FIG. 26 is an isometric view of a third embodiment of the present invention.
Figure 26A:
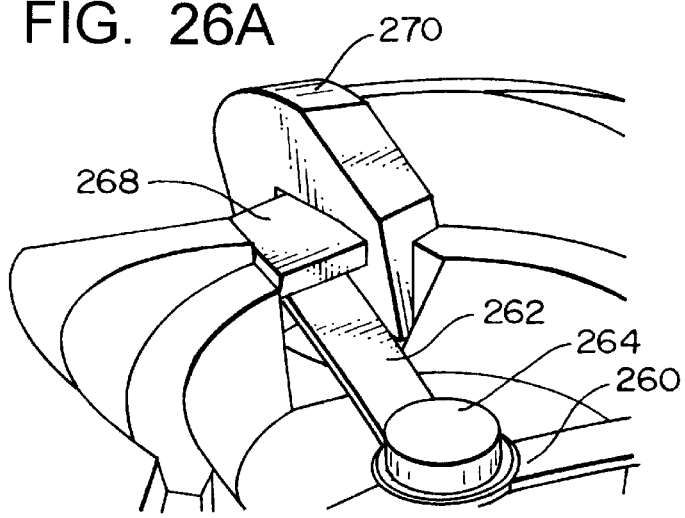
FIGS. 26a and 26b are isometric views taken from radially inward and radially outward locations above the tool of the second embodiment.
Figure 26B:
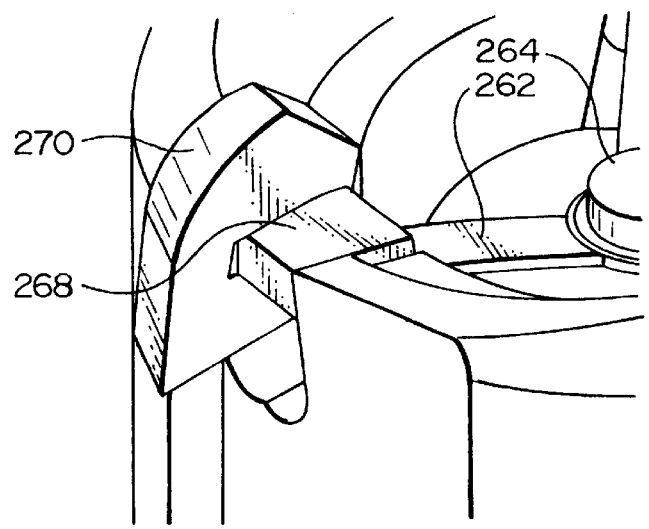
Figure 26C:
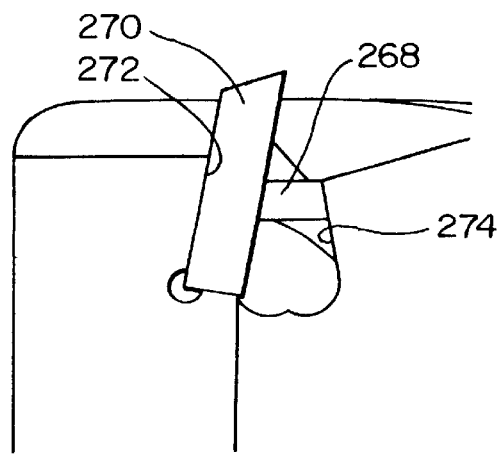
FIG. 26c is a view of one of the cutter inserts and its related components looking radially inwardly toward the tool of the third embodiment.

FIG. 26 shows a mounting member 252 having a plurality of pockets 254, each of which is to receive a related cutting insert and clamping block (not shown in FIG. 26). There is a cutting insert holding assembly 256, comprising a spring retaining member 258 having a center portion 260 and a plurality of spring arms 262. There is a bolt member 264 which engages a mounting nut 266. Each of the arms 262 engages a related wedging block 268 (see FIGS. 26a and 26b) which in turn engages the cutter insert 270, which can be the same as or very similar to, the cutting insert 114. With reference to 26C, it can be seen that the cutting insert 270 bears against a contact surface 272 of the pocket and which has a moderate upward slant from the vertical facing in the forward moving or leading direction. It can also be seen that an opposite contact face 274 also has a slant from the vertical which is in a trailing direction, so that the two contact surfaces 272 and 274 slant toward one another in an upward direction.

The nut 266 is interiorly threaded and is made non-rotatable in some manner. For example, it could be engaged with the center member 260 of the positioning member by means of a detent or keyway or in some other in manner to prevent rotation. When the bolt 264 is rotated the bottom of the nut presses against the surface of the center portion 260 thus raising the center portion 260 of the positioning member 258. This does not require the forming threads in the body itself, and it also gives easy access to the bolt 264 from above. Also, the top of the bolt acts as a stop member to limit the upward travel of the center portion 260.

Figure 27A:
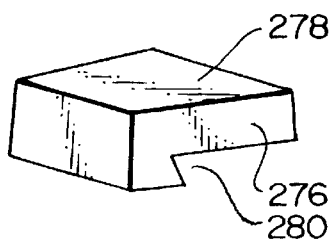
FIGS. 27a, 27b, 27c and 27d are isometric, top, and two side views of a modified wedging block.
Figure 27B:
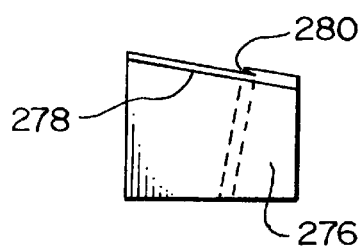
Figure 27C:
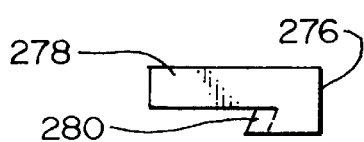
Figure 27D:
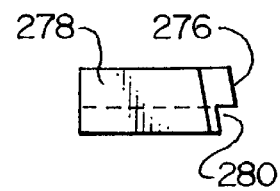

FIGS. 27a, b, c and d are views of a somewhat modified form of a clamping or wedging block 276, which could be used in the tool of FIG. 26. It can be seen that the clamping block 276 has a main body portion 278, and there is a radially inwardly facing undercut surface 280 which is slanted moderately from a line which would be at a right angle to the radius of the cutting tool. Thus, the spring arm or other contact member which urges the wedging block 276 outwardly could engage the block at somewhat of a slant to accomplish a particular application of the radial outward force.

Figure 28:
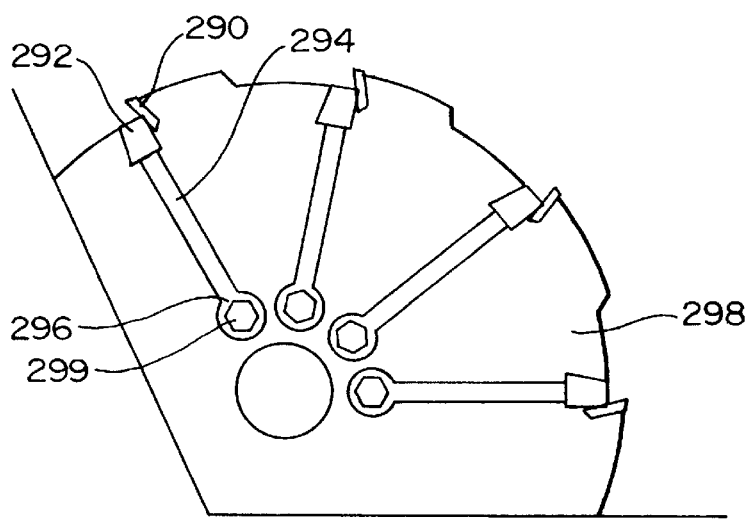
FIG. 28 is a further modified form of the present invention, where individual positioning arms urge the wedging blocks into wedging engagement.

FIG. 28 shows yet another embodiment of the present invention, where there is a plurality of cutting inserts 290 located by related wedging blocks 292, which are held in place by related radially extending positioning arms 294. Each positioning arm 294 has a radially inward end 296 that is mounted to the mounting member 298. This end 296 can be urged radially outwardly in a variety of ways, such as by an eccentric member at 299 which could be rotated to push the arms 294 outwardly, or by providing individual bolts with a nut to enable the inner arm end to be raised or some other means.

Figure 29:
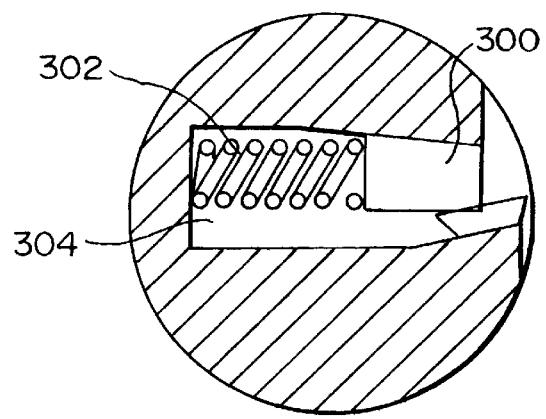
FIG. 29 shows yet another modification where individual spring elements urge the wedging blocks into wedging engagement.

In FIG. 29 there is shown another modified form of the present invention where the wedging block 300 is urged by a compression spring 302 radially outwardly. This spring 302 is positioned in a pocket 304. As a further modification, this arrangement of the spring 302 pressing against a wedging member 304 could be incorporated in the radially outward end of one of the positioning arms 294 of FIG. 28, or against another positioning means such as a cam or wedge mechanism.

Figure 29A:
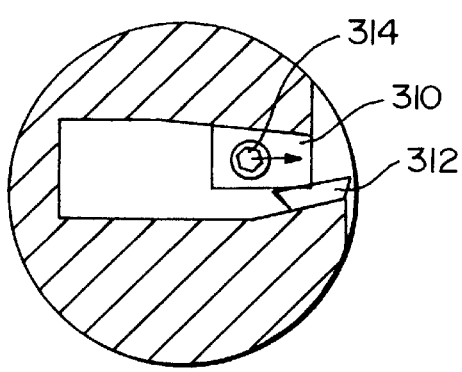
FIG. 29a is a view similar to 29, showing a eccentric nut or cam urging the wedging block into wedging engagement.

FIG. 29a shows yet another modified version where there is a wedging block 310 pressing against the cutter insert 312. The wedging block 310 is urged into the wedging surfaces by an eccentric or a cam member 314 which is rotated to urge the block 310 radially outwardly.

Figure 29B:
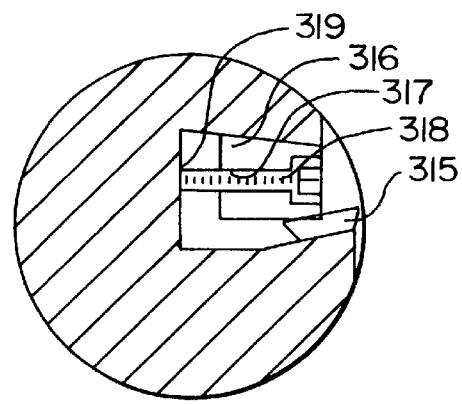
FIG. 29b is a view similar to 29 and 29a showing a positioning screw operating on the wedging block to urge it to its wedging position.

FIG. 29b shows another variation of the present invention, where the cutting insert 315 is held in its operating position in wedging relationship with the wedge block 316. The wedge block 316 has a threaded radially aligned through opening 317 in which is positioned a positioning screw 318. The radially inward end of the screw 318 bears against a surface 319. By rotating the screw 318, the wedging block 316 can be moved outwardly into wedging engagement with the cutting insert 315.

Figure 30:
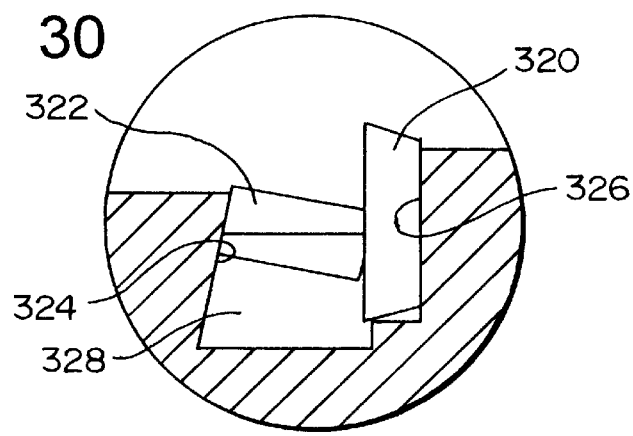
FIG. 30 is a view similar to 29 showing the wedging block in its wedging position.

FIG. 30 shows another arrangement where the cutter insert 320 is held in place by a wedging block 322 which bears against a slanted contact surface 324, and with the cutter insert 320 bearing against another contact surface 326.

The two contact surfaces 324 and 326 slant toward one another in a radially outward direction. Thus, the block 322 can be positioned in the pocket 328 defined by the two contact surfaces 324 and 326 and then pushed radially outwardly so that the block 322 comes into wedging engagement between the contact surface 324 and the contact surface of the cutter insert 320. The angle between the contact surfaces 324 and 326 is sufficiently small so that the frictional engagement of the members holds the cutter insert 320 and the wedging block 322 in place.

Figure 31:
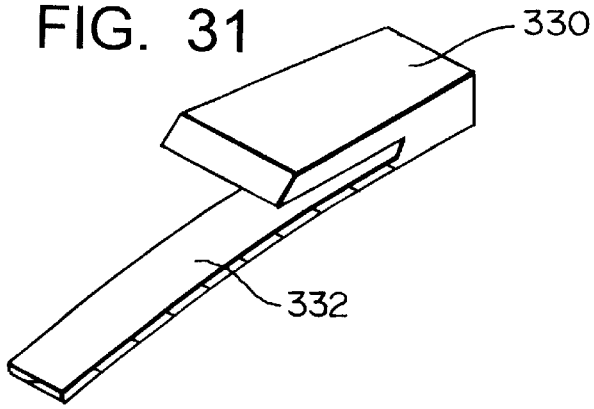
FIG. 31 is a isometric view showing a modified form of one of the spring arms engaging the wedging block.
Figure 32:
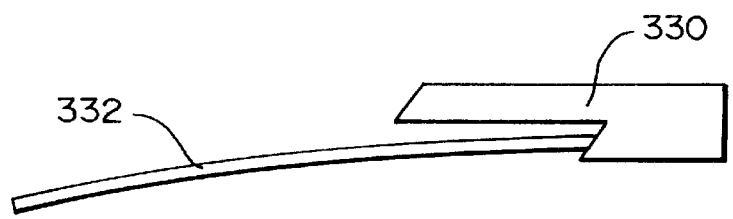
FIG. 32 is a side elevational view of FIG. 31.

FIG. 31 shows another modification, where there is a wedging block 330 which is urged outwardly by a spring arm 332 which has a moderately curved configuration to provide its spring action. This is to illustrate that a single separate spring arm 332 could be used to accomplish the radially outward force. FIG. 32 is a side elevational view of the block and spring arm of FIG. 31.

FIG. 33 shows yet another version where there is a wedging block 340 which is urged outwardly by a curved spring arm 342 pressing outwardly from a center mounting member 344 which is shown somewhat schematically. This spring arm 342 is a cylindrical rod-like member which may be a wire which is drilled or slotted into the wedging member 340 and center mounting member 344.

FIG. 34 shows a further embodiment, where there is a non-rotatable actuating nut 360 having an upper surface 362 formed with three radially extending slots 364, with each slot 364 having a generally rectangular cross sectional configuration. At the bottom of each slot 364 there is a related downwardly extending cylindrical recess 366 in which is inserted a related compression spring 368.

There is a positioning member (i.e. retaining member) 370, having a center portion 372 and three arms 374. The three arms 374 each fit in a radially extending slot 364. As in the prior embodiments, there is a center bolt 376 which engages nut member 360 positioned at the center of the mounting member (not shown), so that the rotation of the threaded bolt 376 can raise or lower the nut 360 to raise or lower the center portion 372 of the positioning member 370. The slotted configuration of the nut 360 provides recesses to accomodate the spring arms 374 during operation.

The function of the compression springs 368 is to urge the retaining member 370 upwardly so as to provide a moderate radially outward force in the arms 374. Thus, in positioning the cutting inserts and the wedge blocks, this moderate radially outward force of the arms 374 permits the wedging block and insert to be more easily positioned, and after this is accomplished, the bolt 376 can be rotated to raise the nut 360 to cause the desired increase in the radially outward force of the arms 374.

FIGS. 35a through 35e show the arrangement where there is a wedging block 400 and a cutting insert 402, both positioned within a related pocket 404. The cutting insert 402 has a contact recess 406 where there is a generally radially outwardly extending contact surface 408 that comes in contact with a related surface 410 of the wedging block 400. The mounting member 412 has a contact surface 414 which is radially aligned, and this engages a radially aligned contact surface 416 of the wedging block 400. The wedging surface 410 of the block 400 is slanted from the radial outward direction so that it slants outwardly in a leading direction (i.e. in the direction of circumferential movement of the body 412). The contact surface 408 of the cutting insert 402 has a slant to match that of the contact surface 410 so that there is contact over a sufficiently large surface to avoid fracturing of the cutter insert 402. The mounting member 412 also has a trailing contact surface 418 that engages the trailing surface of the cutting insert 402. This contact surface 418 is slanted from radial alignment, so that it has a sharper slant (relative to the radius) than the recess contact surface 408.

Figure 35A:
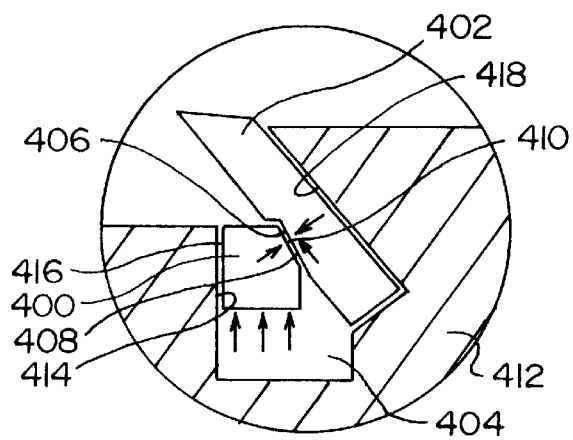
FIGS. 35a through 35g show seven different arrangements of the wedging block and cutting insert.

In FIG. 35a, some of the force components are shown somewhat schematically to illustrate how these are exerted to cause the wedging block 400 and the cutter insert 402 to be in wedging relationship.

Figure 35B:
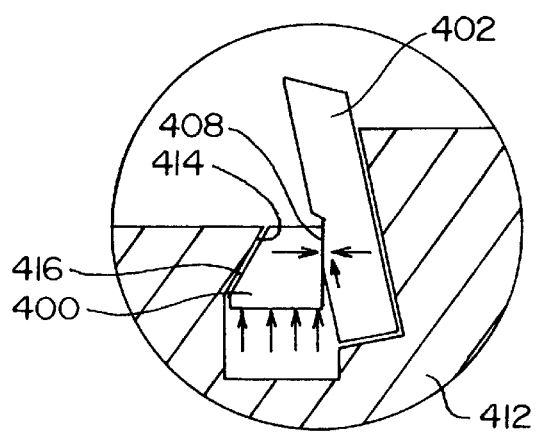

FIG. 35b shows substantially the same arrangement as in FIG. 35a, except that the contact surface 414 and the matching surface 416 both slant radially outwardly in a trailing direction. In this configuration, the cutting insert contact surface 408 is radially aligned. Some of the force components showing wedging relationships are shown.

Figure 35C:
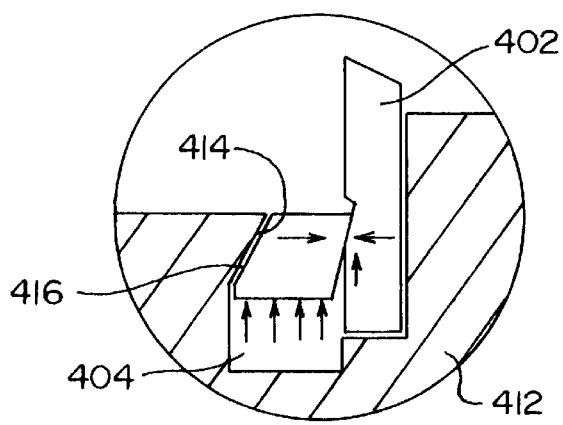

FIG. 35c shows a similar arrangement as in FIGS. 35a and 35b, and specifically, the arrangement of 35c is quite similar to FIG. 35b, except that the two contact surfaces 414 and 416 are at a larger angle relative to a radially outward alignment, so that the force components created are somewhat different from those shown in FIG. 35b, in that the radially inward force components exerted by the surface 414 is relatively greater relative to the circumferentially extending wedging force component.

Figure 35D:
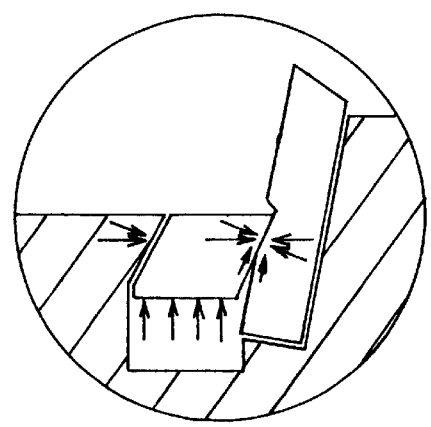

FIG. 35d shows yet another arrangement where the various contact surfaces at other angular positions relative to radial alignment. In general, it is contemplated that the arrangement shown in FIG. 35d may be less advantageous. However, for certain mounting requirements, this arrangement could be used, while still providing the wedging relationship to hold the cutter in place.

Figure 35E:
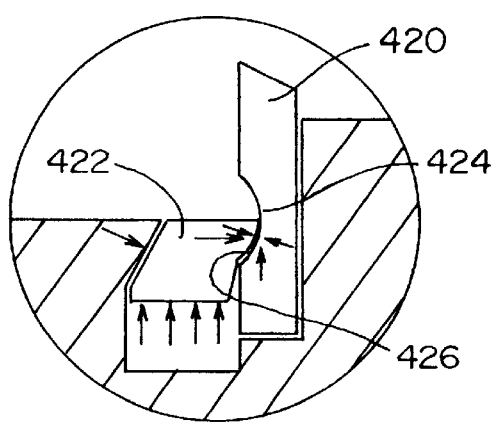

FIG. 35e shows a cutting insert 420 with a wedging member 422 having a convexly curved contact surface 424 engaging a related concave contact surface 426 formed in the cutting insert 420. The surfaces 424 and 426 can have exactly the same degree of curvature. Alternatively, the curvature may be somewhat different so that there would be surface contact of two portions of the spherically curved surfaces. There would be sufficient deformation in the area of contact so that there would not be point contact, and this area would be sufficiently large to avoid damaging the insert 420.

Figure 35F:
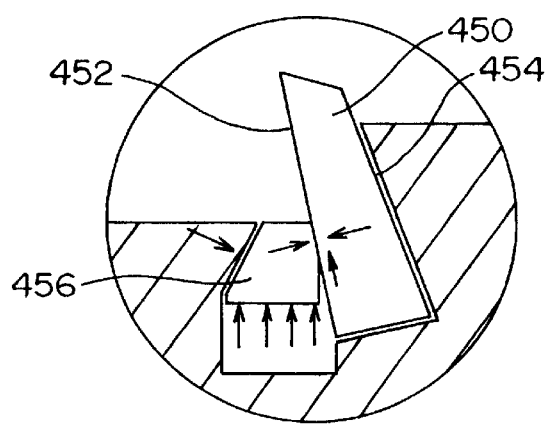

FIG. 35f shows another modified version where the cutting insert 450 has two contact surfaces 452 and 454 which are slanted so that these converge toward one another in a radially outward direction. This particular arrangement may be somewhat more difficult to manufacture, but would be a possible alternative to provide certain relationships in the forces applied to the cutting insert 450, and the wedging member 456.

Figure 35G:
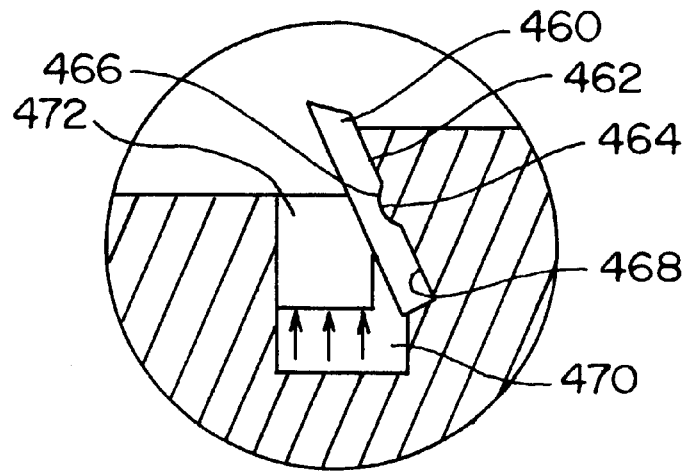

FIG. 35g shows yet another embodiment, where there is a cutter insert 460 having on its trailing surface 462 a concave recess 464 which matches with a convex protrusion 466 on the trailing surface 468 that forms the trailing surface of the pocket 470. The wedging block 472 is wedging engagement with the insert 460 and also causes a wedging engagement of the surfaces 464 and 466.

Figure 36:
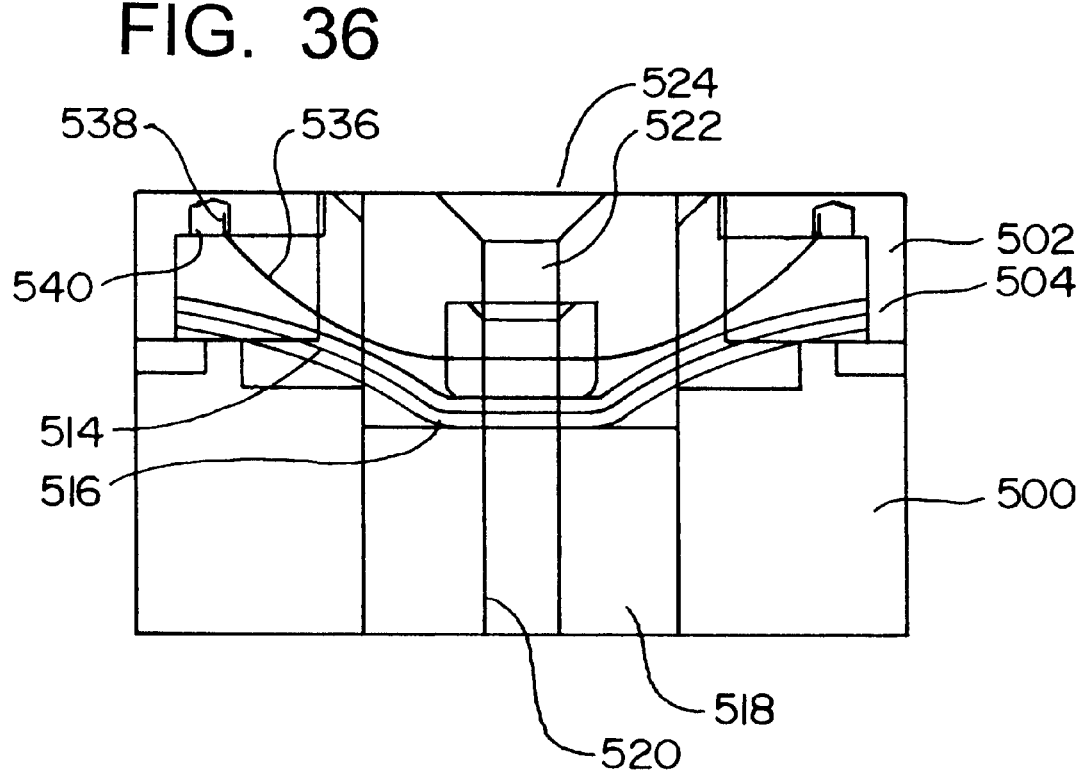
FIG. 36 is a sectional view taken through the center axis of the tool, showing a fourth embodiment of the present invention.
Figure 37:
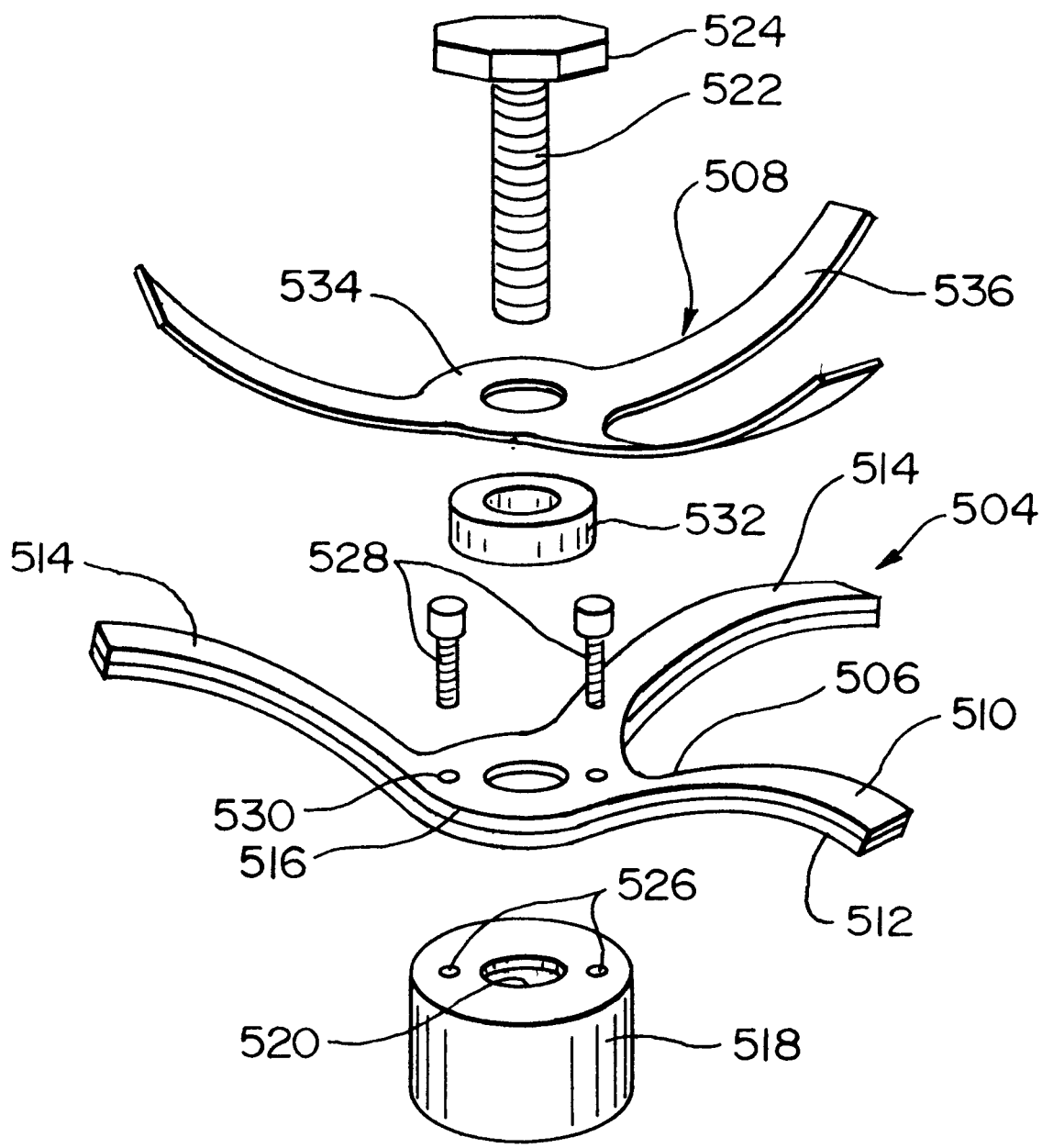
FIG. 37 is an isometric exploded view showing the cutting tool of FIG. 36.

FIGS. 36 and 37 show yet a fourth embodiment of the present invention. There is shown the mounting block 500 having a plurality of wedging blocks 502. For convenience of illustration, the cutting inserts are not shown. There is a positioning actuating assembly 504 which comprises spring member 506 is shown as a leaf spring, having upper lower sections 510 and 512. This spring member 506 is formed with a plurality of arms 514 and a center portion 516.

There is an actuating nut 518 that has a center threaded opening 520 to receive the threaded shank 522 of the actuating bolt 524. Also, the nut 518 has two laterally spaced threaded screw openings 526, each to receive a related screw 528 that extends through related openings 530 in the main positioning spring 506. These screw members 528 hold the nut 518 against the bottom surface of the central spring arm portion 516. Thus, the nut 518 and the center spring portion 516 move together. There is floating spacing member 532 positioned between a central portion 534 of the auxiliary spring 508 and the central portion 516 of the main positioning spring 506.

The auxiliary spring 508 has a plurality of outwardly and upwardly extending arms 536, and the outer ends 538 of each arm 536 fits within a related downwardly facing recess 540 in each of the wedging blocks 502. This spring member 508 exerts a moderate positioning force against the wedging block 502 to raise it into its wedging position. (In this particular example, the pocket is formed so that it converges in both a radially outward and upward direction.) When it is desired to either remove or adjust one of the cutting inserts, a related arm 536 can be deflected downwardly so as to permit the related wedging block 502 to move out of tight wedging engagement. This will permit the cutting insert to be removed and/or adjusted in position. When the cutting inserts are properly positioned, then the bolt 524 can be rotated to cause the nut 518 to move upwardly and thus move the main positioning spring central portion 516 upwardly and cause the positioning arms 514 to firmly engage their related wedging blocks 502.

It will be understood that many variations are possible in construction of the tool that have not been shown or described. These should be considered to fall within the spirit and scope of the invention if encompassed within the following claims.

What is claimed is:

1. A rotary tool having a center axis of rotation, said tool comprising:

a) a mounting structure positioned and arranged to rotate about said axis;

b) said mounting structure having a plurality of radially outwardly positioned mounting sections, each mounting section having a pair of side walls which define a related pocket which is aligned to have a substantial radial alignment component, said pair of side walls converging toward one another in a converging direction which has a radially outward directional component, each pocket being arranged to have a related cutting insert positioned therein in its cutting position;

c) a holding assembly comprising a plurality of positioning and wedging portions for related mounting sections, each of said positioning and wedging portions comprising a wedging block portion, each positioning and wedging portion having a cutting insert retaining position where the insert and the wedging block portion are positioned in the related pocket where side bearing surfaces of the wedging block portion and side bearing surfaces of the cutting insert are in load bearing relationship between the related side walls of the pocket in a wedging relationship therewith, and an actuating portion which is in operative engagement with the positioning and wedging portions, said actuating portion being moveable to a retaining position to apply force to cause the wedging block portions and the inserts to be urged into wedging relationship with the related two converging side walls;

d) said actuating portion comprising a plurality of actuating devices operatively engaging a related positioning and wedging portion, each of said actuating devices resiliently urging the related positioning and wedging portion toward its retaining position, with each of said actuating devices being resiliently deflectable so as to be able to be moved to reduce wedging engagement and permit movement or removal of the related insert; whereby the actuating devices are arranged to be moved to retaining positions to hold the cutting inserts in proper location, and then be moved from the retaining position to reduce said force and thus reduce the force of wedging engagement and permit the inserts to be adjusted or removed and/or replaced.

2. The tool as recited in claim 1, further comprising a plurality of cutting inserts, each positioned in its cutting position in its related pocket, with each cutting insert being in wedging engagement with its relating wedging block portion.

3. The tool as recited in claim 2, wherein each pair of side walls in the mounting structure comprises a leading side wall and a trailing side wall, each cutting insert having a leading side wall surface and a trailing side wall surface, each of which positioned in a cutter surface plane, one of said side wall surfaces of the cutter surfaces having a wedging contact surface portion which deviates angularly from the plane of the other side wall surface of the cutter and positioned to come into bearing engagement with its related wedging block portion in a manner to accomplish wedging engagement therewith.

4. The tool as recited in claim 3, wherein said contact surface portion is formed as a recess in its related side wall surface.

5. The tool as recited in claim 4, wherein said contact surface portion is a planar surface portion.

6. The tool as recited in claim 5, wherein said contact surface portion forms an angle with its related cutter surface between about 5° and 20°.

7. The tool as recited in claim 4, wherein the recess which provides the contact surface portion slants angularly from its related surface in a radially outward direction.

8. The tool as recited in claim 4, wherein said contact surface is formed as a concavely curved surface portion.

9. The tool as recited in claim 4, wherein the contact surface portion of each cutting insert is formed with a plurality of contact surface segments which are positioned relative to one another at spaced angular intervals, whereby each cutting insert is arranged to be moved to different angular positions relative to its pocket, to position a selected contact surface segment in proper position for wedging engagement with its related wedging block portion.

10. The tool as recited in claim 1, wherein each wedging block portion also has a positioning member to restrain its related wedging block portion from movement out of its related pocket.

11. The tool as recited in claim 1, wherein said actuating devices comprise a plurality of positioning arms extending radially outwardly, with each of said positioning arms engaging a related positioning and wedging portion.

12. The tool as recited in claim 11, wherein each of said positioning arms engages a related wedging block portion are configured so that the wedging block portion and the positioning arm engage one another in a recess and protrusion engaging relationship, where the protrusion fits in the recess.

13. A The tool as recited in claim 12 wherein each wedging block portion has a radially inwardly facing recess, and its related positioning arm extends into said recess.

14. The tool as recited in claim 12, wherein each positioning arm engages its related wedging block portion to urge the wedging block portion radially outwardly and vertically, and said converging direction is radially outwardly and also vertically in the direction in which the related wedging block portion is urged.

15. The tool as recited in claim 1, wherein the converging direction of the side walls of the mounting portion also has a vertical directional component.

16. The tool as recited in claim 15, wherein said vertical directional component is directed upwardly, in a direction of a reference plane that is perpendicular to said axis of rotation and which passes through cutting portions of the cutting inserts, and the force of the actuating sub-assembly against each of the positioning and wedging portions results in wedging engagement in a radially outward and upward direction.

17. The tool as recited in claim 1, wherein said actuating portion comprises a first main actuation portion having a central section and a plurality of actuating arms extending radially outwardly therefrom to engage related positioning and wedging portions, and an auxiliary actuating portion which has a auxiliary center portion and auxillary spring arm portions which extend radially outwardly from the auxiliary central portion, auxiliary spring arms being biased to urge each of the positoning and wedging portions with moderate force into the retaining position while the main actuating portion is in a non-maintaining retaining position, whereby the individual positioning and wedging portions arranged to be moved against the action of the auxilliary actuating portion out of retaining position to permit movement and/or replacement of the related cutting inserts.

18. A rotary tool having a center axis of rotation, said tool comprising:
 a) a mounting structure positioned and arranged to rotate about said axis;
 b) said mounting structure having a plurality of radially outwardly positioned mounting sections, each mounting section having a pair of side walls which define a related pocket which is aligned to have a substantial radial alignment component, said pair of side walls converging toward one another in a converging direction which has a radially outward directional component, each pocket being arranged to have a related cutting insert positioned therein in its cutting position;
 c) a holding assembly comprising a plurality of positioning and wedging portions for related mounting sections, each of said positioning and wedging portions comprising a wedging block portion, each positioning and wedging portion having a cutting insert retaining position where the insert and the wedging block portion are positioned in the related pocket where side bearing surfaces of the wedging block portion and side bearing surfaces of the cutting insert are in load bearing relationship between the related side walls of the pocket in a wedging relationship therewith, and an actuating portion which is in operative engagement with the positioning and wedging portions, said actuating portion being moveable to a retaining position to apply force to cause the wedging block portions and the inserts to be urged into wedging relationship with the related two converging side walls;
 d) said actuating portion comprising a plurality of positioning arms extending radially outwardly, with each of said positioning arms engaging a related positioning and wedging portion, each actuating portion further comprising an actuating sub-assembly which comprises a central portion to which said actuating arms are connected, and outer ends of said actuating arms are movable to the retaining positions from said central portion of the actuating sub-assembly, whereby the actuating portion is arranged to be moved to its retaining position to hold the cutting inserts in proper location, and then be moved from the retaining position to reduce said force and thus reduce the force of wedging engagement and permit the insert to be adjusted, removed or replaced.

19. The tool as recited in claim 18, wherein each of the wedging block portions is connected to a related one of the actuating arms so as to be movable with its relating actuating arms into its retaining position.

20. The tool as recited in claim 18, wherein each of said actuating arms is separate from its related wedging block portion and is able to move into and out of its engagement with its related wedging block portion.

21. The tool as recited in claim 18, wherein movement of said positioning arms to and from the retaining position is caused by vertical movement of said central portion of the actuating sub-assembly along said axis of rotation.

22. The tool as recited in claim 21, wherein said actuating sub-assembly comprises a linear actuating device operatively engaging the central portion of the actuating sub-assembly to move the central portion vertically.

23. The tool as recited in claim 22, wherein said linear actuating device comprises a screw member having operative engagement with the central portion of the actuating sub-assembly and operative engagement with said mounting structure, said screw member being arranged so that rotation of said screw member causes displacement of relative locations of operative connections to said mounting structure and said central portion.

24. The tool as recited in claim 23 wherein said screw member has threaded engagement with a threaded member that is in turn engaged and/or operatively engaged with the mounting structure.

25. The tool as recited in claim 23, wherein said screw member comprises a bolt member having a head and a threaded shank, and the head is at a position which is spaced upwardly from a lower central portion of the mounting structure toward a reference plane which is perpendicular to the axis of rotation and extends through cutting locations of the cutting insert when in their cutting position.

26. The tool as recited in claim 21 wherein said mounting structure has a base portion by which said mounting structure can be connected to a drive member, and said tool has a reference plane which is a plane generally perpendicular to the axis of rotation and extends through cutting edge portions of the cutting inserts at a location above said base portion, said central portion being positioned below said reference plane and movable upwardly toward said reference plane to cause radially outward movement of radially outward portions of said positioning arms.

27. The tool as recited in claim 21, wherein each of said positioning arms is a resilient positioning arm which is able to deflect so as yieldingly urge related positioning and wedging portions to their retaining positions.

28. The tool as recited in claim 21, wherein each of the positioning arms is arranged to deflect resiliently in a vertical direction from the central portion of the actuating sub-assembly.

29. The tool as recited in claim 28, wherein each of said arms has a leaf spring configuration.

30. The tool as recited in claim 29, wherein each of said arm comprises a plurality of leaf springs.

31. The tool as recited in claim 18, wherein there is an auxiliary positioning spring which urges the actuating sub-assembly towards its retaining position with a force that is such as to permit the actuating sub-assembly to be deflected moderately to permit movement or replacement of the cutting insert.

32. The tool as recited in claim 31, wherein said actuating portion is arranged so that the positioning arms are, in the retaining position, urged into wedging engagement with the positioning and wedging portions with a wedging force that is greater than the force which is provided by the auxiliary positioning spring.

33. The tool as recited in claim 32, wherein the actuating portion comprises an actuating sub-assembly which in turn comprises a central portion to which the actuating arms are connected, and the outer ends of the actuating arms are resiliently movable to a retaining position.

34. The tool as recited in claim 21, wherein each of said positioning arms is pivotally located to the central portion of the actuating sub-assembly so that vertical movement of the central portion of the actuating sub-assembly causes radial outward and inward movement of the positioning arms by movement of the positioning arms about their pivot locations.

35. A rotary tool having a center axis of rotation, said tool comprising:
a) a mounting structure positioned and arranged to rotate about said axis;
b) said mounting structure having a plurality of radially outwardly positioned mounting sections, each mounting section having a pair of side walls which define a related pocket which is aligned to have a substantial radial alignment component, said pair of side walls converging toward one another in a converging direction which has a radially outward directional component, each pocket being arranged to have a related cutting insert positioned therein in its cutting position;
c) a holding assembly comprising a plurality of positioning and wedging portions for related mounting sections, each of said positioning and wedging portions comprising a wedging block portion, each positioning and wedging portion having a cutting insert retaining position where the insert and the wedging block portion are positioned in the related pocket where side bearing surfaces of the wedging block portion and side bearing surfaces of the cutting insert are in load bearing relationship between the related side walls of the pocket in a wedging relationship therewith, and an actuating portion which is in operative engagement with the positioning and wedging portions, said actuating portion being moveable to a retaining position to apply force to cause the wedging block portions and the inserts to be urged into wedging relationship with the related two converging side walls;
d) said actuating portion resiliently held in its retaining position, and there is resilient deflecting means against which the actuating portion can be moved in the direction away from its retaining position, whereby the actuating portion can be moved to reduce force of wedging engagement of the cutting inserts to allow movement and/or removal of cutting inserts, and the actuating portion is arranged to be moved to its retaining position to hold the cutting inserts in proper location, and then be moved from the retaining position to reduce said force and thus reduce the force of wedging engagement and permit the insert to be adjusted and/or removed and/or replaced.

36. A rotary tool having a center axis of rotation, said tool comprising:

a) a mounting structure positioned and arranged to rotate about said axis;

b) said mounting structure having a plurality of radially outwardly positioned mounting sections, each mounting section having a pair of side walls which define a related pocket which is aligned to have a substantial radial alignment component, said pair of side walls converging toward one another in a converging direction which has a radially outward directional component, each pocket being arranged to have a related cutting insert positioned therein in its cutting position;

c) a holding assembly comprising a plurality of positioning and wedging portions for related mounting sections, each of said positioning and wedging portions comprising a wedging block portion, each positioning and wedging portion having a cutting insert retaining position where the insert and the wedging block portion are positioned in the related pocket where side bearing surfaces of the wedging block portion and side bearing surfaces of the cutting insert are in load bearing relationship between the related side walls of the pocket in a wedging relationship therewith, and an actuating portion which is in operative engagement with the positioning and wedging portions, said actuating portion being moveable to a retaining position to apply force to cause the wedging block portions and the inserts to be urged into wedging relationship with the related two converging side walls;

d) said actuating portion portion comprises a plurality of positioning arms extending radially outwardly, with each of said positioning arms engaging a related positioning and wedging portion to exert a radially outwardly directed force against the wedging portions individually operable to be able to move its related positioning and wedging portion into and out of its retaining position, so that individual cutting inserts are arranged to be moved and/or removed;

whereby the positioning arms of the actuating portion are arranged to be moved to retaining positions to hold the cutting inserts in proper location, and then be moved from the retaining position to reduce said force and thus reduce the force of wedging engagement and permit the insert to be adjusted, removed or replaced.

37. A rotary tool having a center axis of rotation, said tool comprising:

a) a mounting structure positioned and arranged to rotate about said axis;

b) said mounting structure having a plurality of radially outwardly positioned mounting sections, each mounting section having a pair of side walls which define a related pocket which is aligned to have a substantial radial alignment component, said pair of side walls converging toward one another in a converging direction which has a radially outward directional component, each pocket being arranged to have a related cutting insert positioned therein in its cutting position;

c) a holding assembly comprising a plurality of positioning and wedging portions for related mounting sections, each of said positioning and wedging portions comprising a wedging block portion, each positioning and wedging portion having a cutting insert retaining position where the insert and the wedging block portion are positioned in the related pocket where side bearing surfaces of the wedging block portion and side bearing surfaces of the cutting insert are in load bearing relationship between the related side walls of the pocket in a wedging relationship therewith, and an actuating portion which is in operative engagement with the positioning and wedging portions, said actuating portion being moveable to a retaining position to apply force to cause the wedging block portions and the inserts to be urged into wedging relationship with the related two converging side walls;

d) said actuating portion comprising a plurality of individual actuating devices, each of which has an engaging portion to engage a related positioning and wedging portion to exert a radially outward force, and each of said actuating devices is individually operable to be able to move its related positioning and wedging portion into its retaining position and retracted, so that individual cutting inserts are arranged to be moved or removed;

whereby the actuating devices can each be moved to its retaining position to hold the cutting inserts in proper location, and then be moved from the retaining position to permit the insert to be adjusted, removed or replaced.

38. The tool as recited in claim 39, wherein said individual actuating devices are each operatively engaging a related wedging block portion.

39. The tool as recited in claim 38, wherein said actuating devices comprise spring means urging related wedging block portions into wedging relationship.

40. The tool as recited in claim 38, whrein each of said actuating devices comprises cam means operatively engaging to the wedging block portion of its related positioning and wedging portion.

41. The tool as recited in claim 38, wherein each of said actuating devices comprises a threaded linear actuator operatively engaging the wedging block portion.

* * * * *